June 7, 1955   C. W. MOTT   2,709,836
MACHINE FOR MAKING SURGICAL SPONGES
Filed Nov. 20, 1948   14 Sheets-Sheet 1

INVENTOR.
Carl W. Mott
BY
Atty.

June 7, 1955  C. W. MOTT  2,709,836
MACHINE FOR MAKING SURGICAL SPONGES
Filed Nov. 20, 1948  14 Sheets-Sheet 2

INVENTOR.
Carl W. Mott
BY
Atty

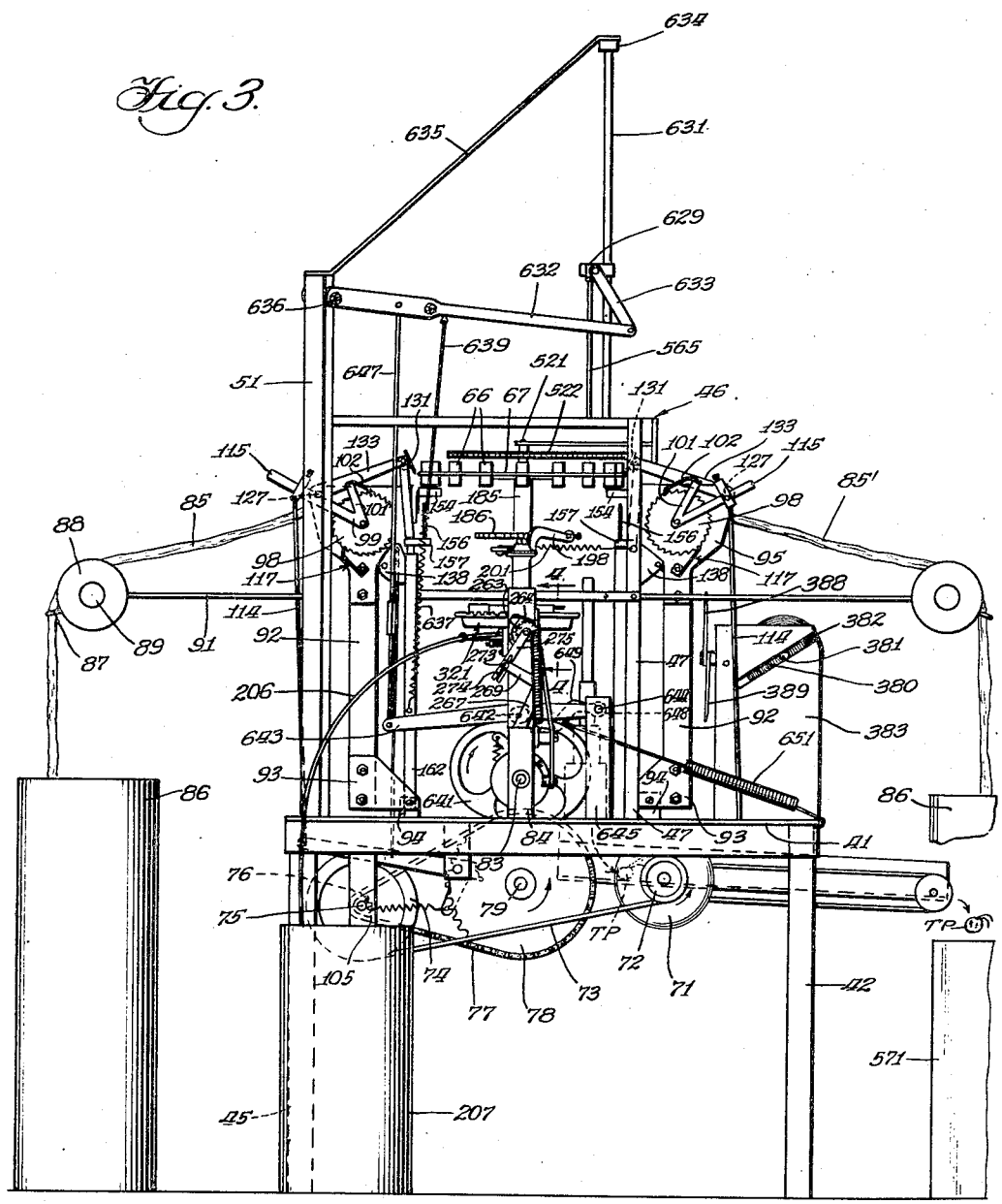

June 7, 1955
C. W. MOTT
2,709,836
MACHINE FOR MAKING SURGICAL SPONGES
Filed Nov. 20, 1948
14 Sheets-Sheet 4
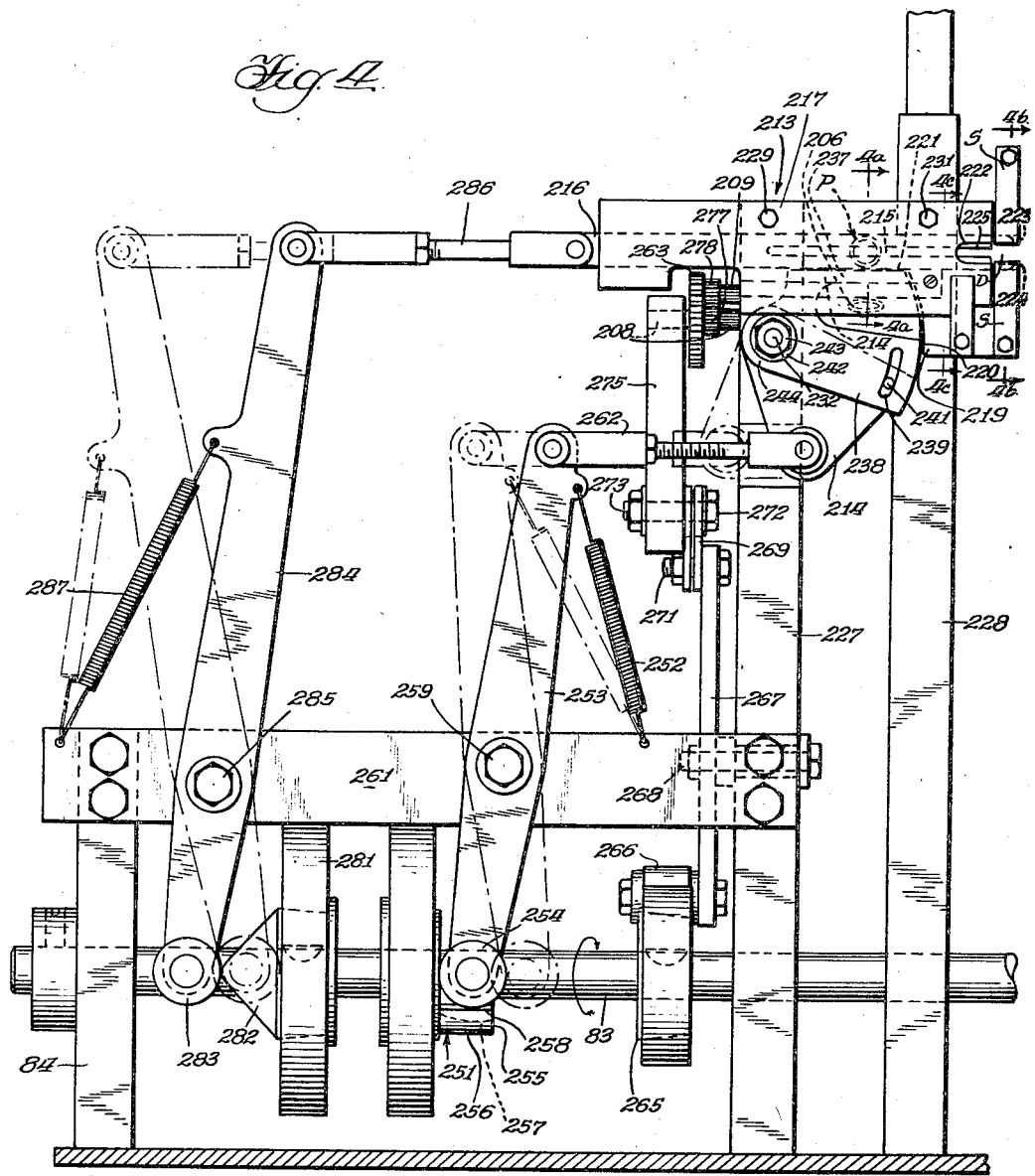
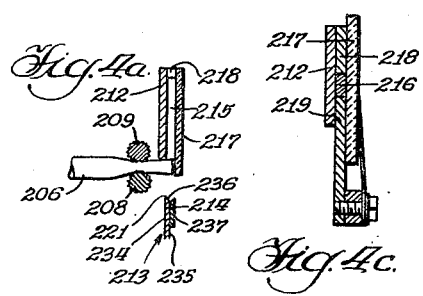
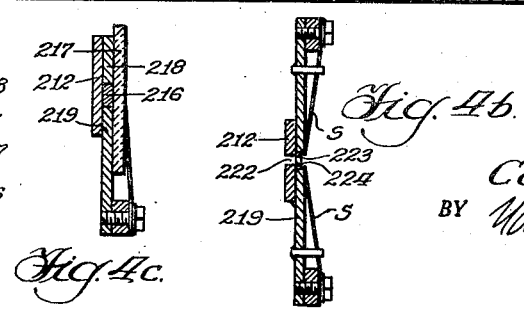
INVENTOR.
Carl W. Mott
BY
Atty

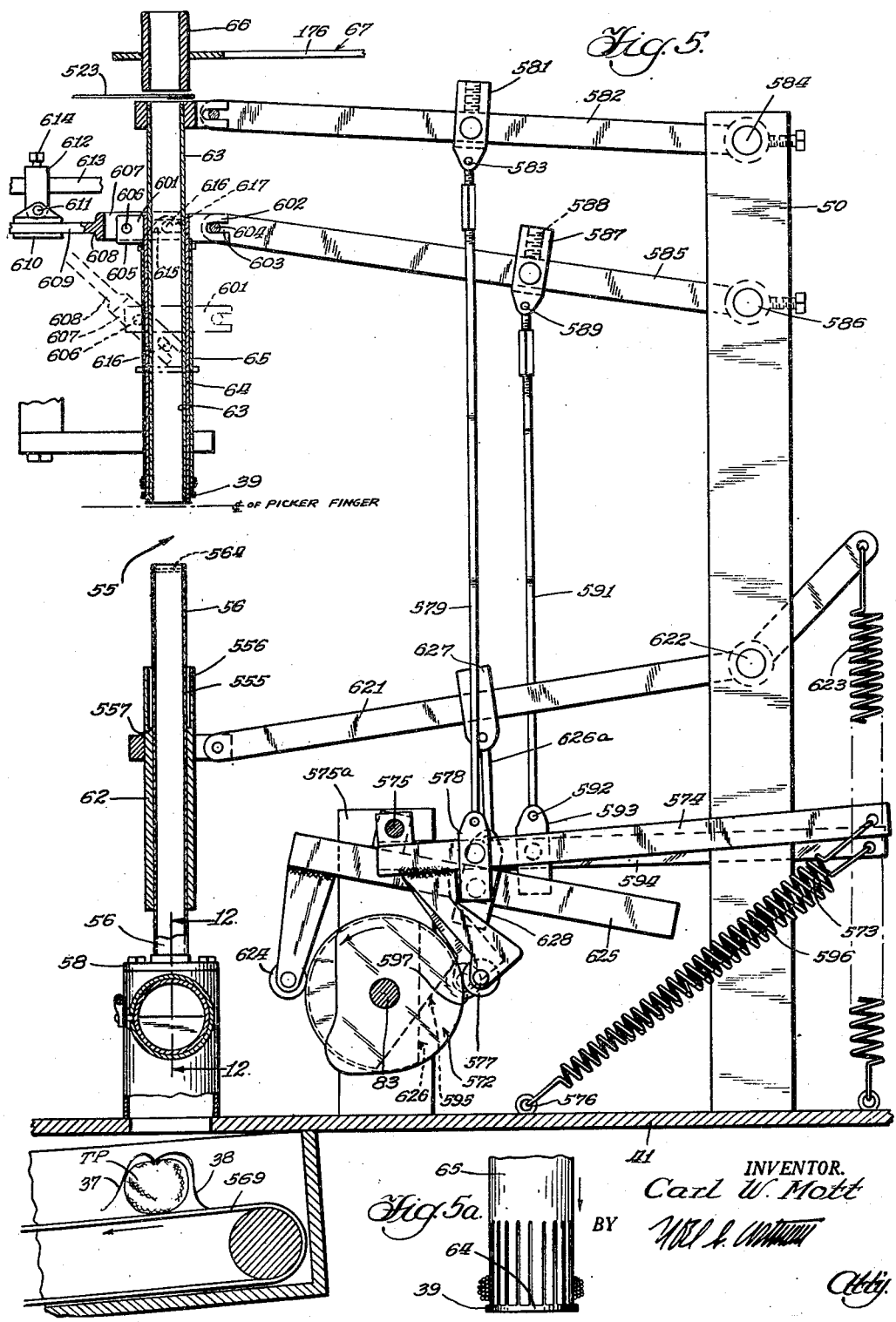

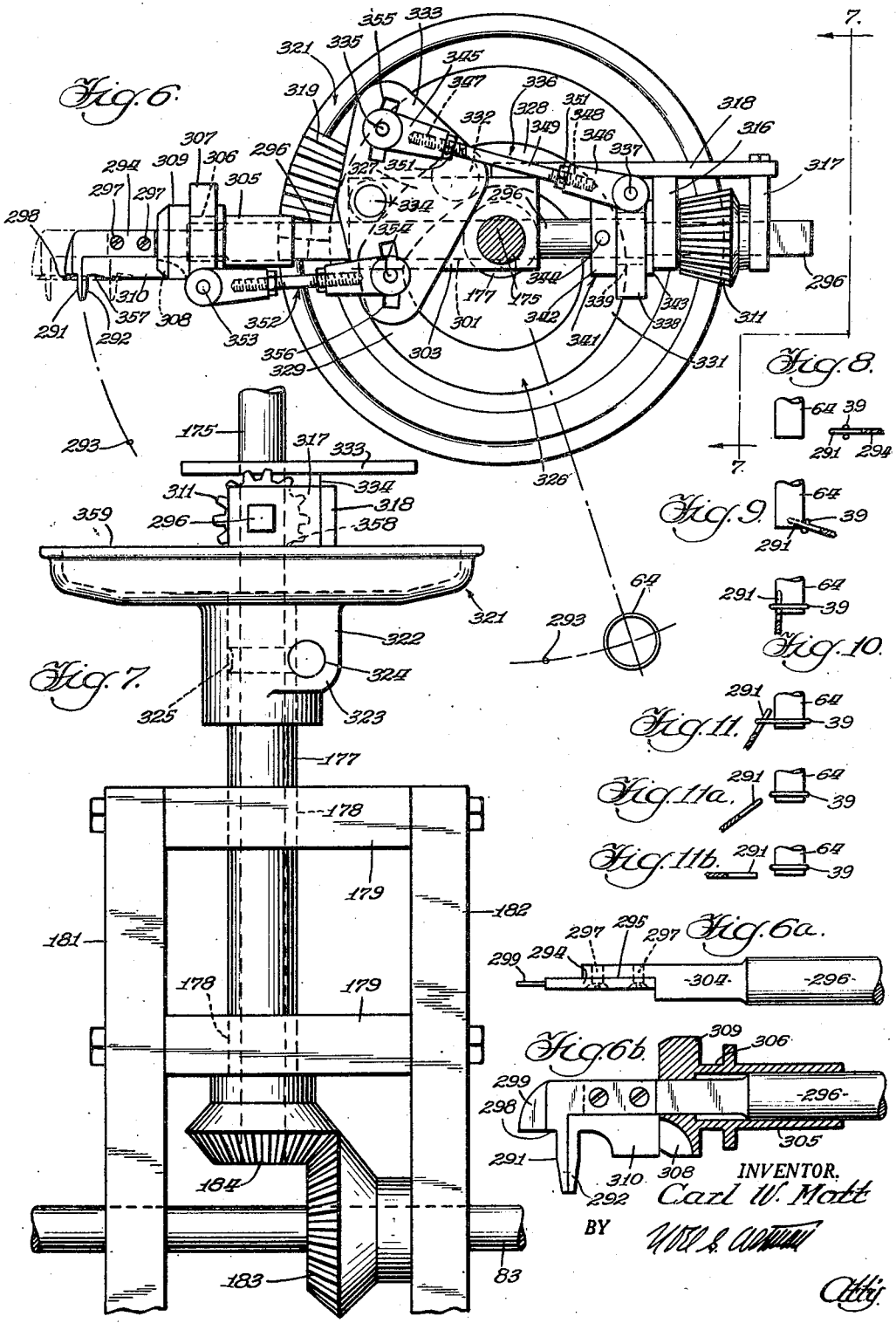

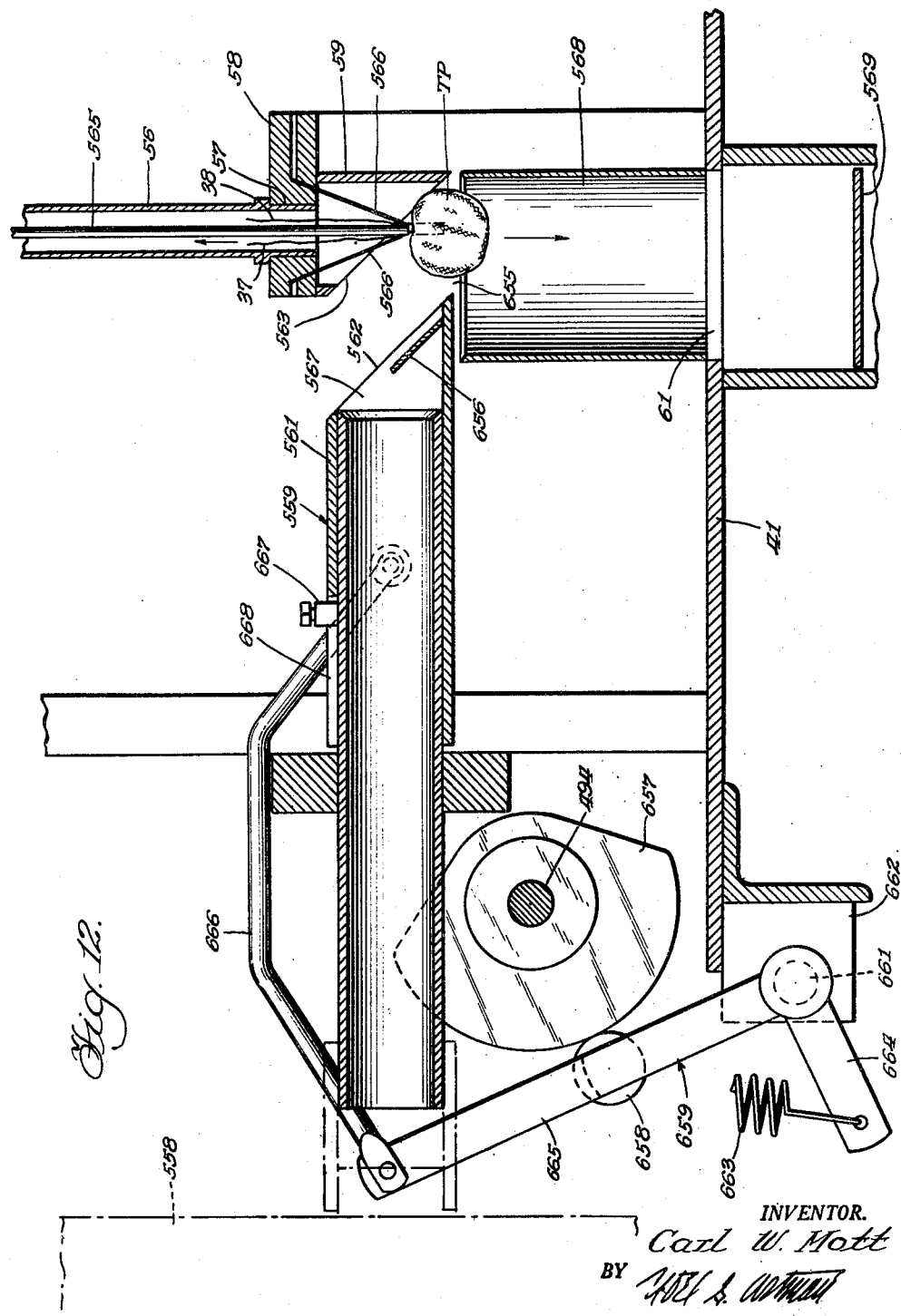

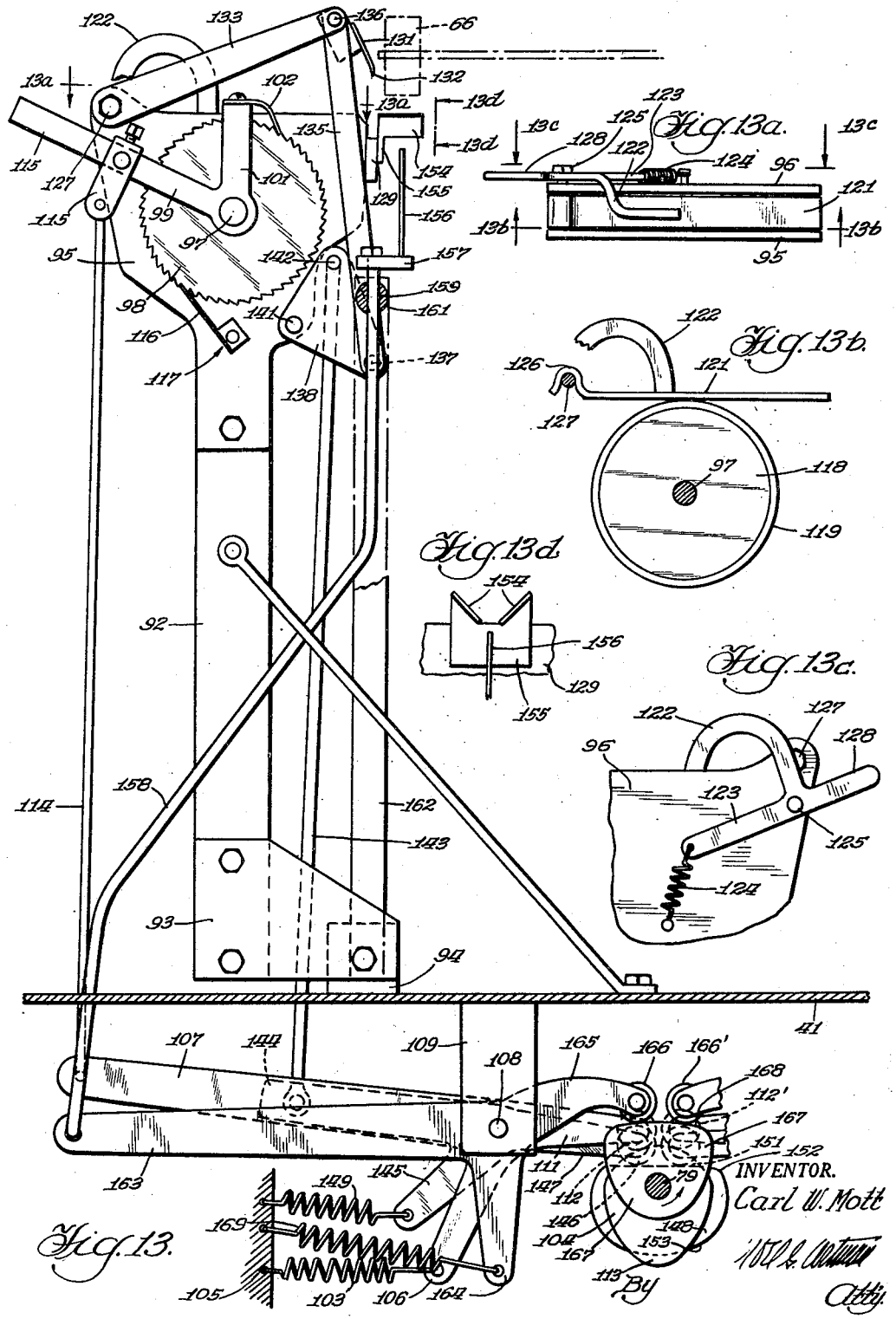

June 7, 1955 C. W. MOTT 2,709,836
MACHINE FOR MAKING SURGICAL SPONGES
Filed Nov. 20, 1948 14 Sheets-Sheet 9
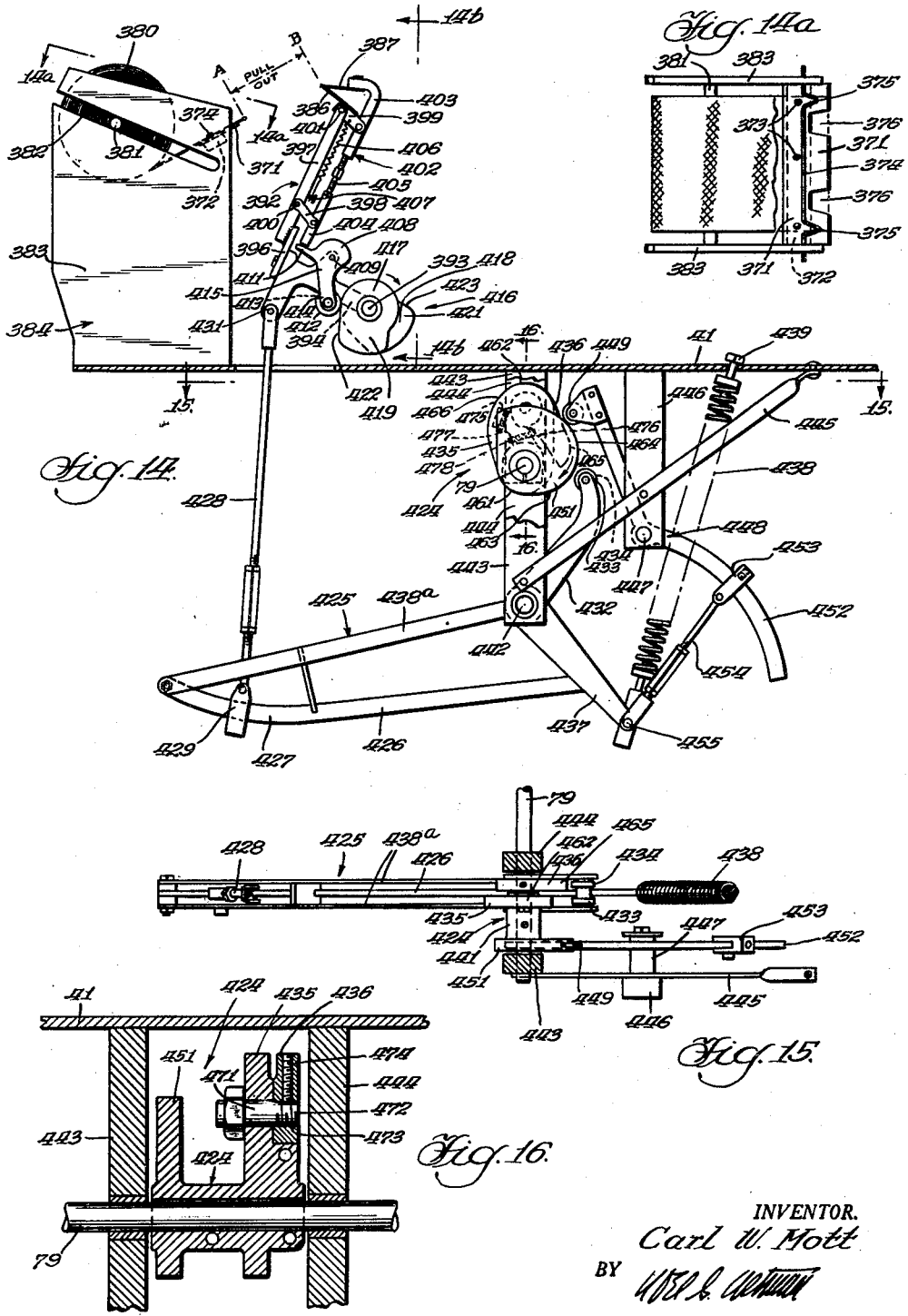
INVENTOR.
Carl W. Mott

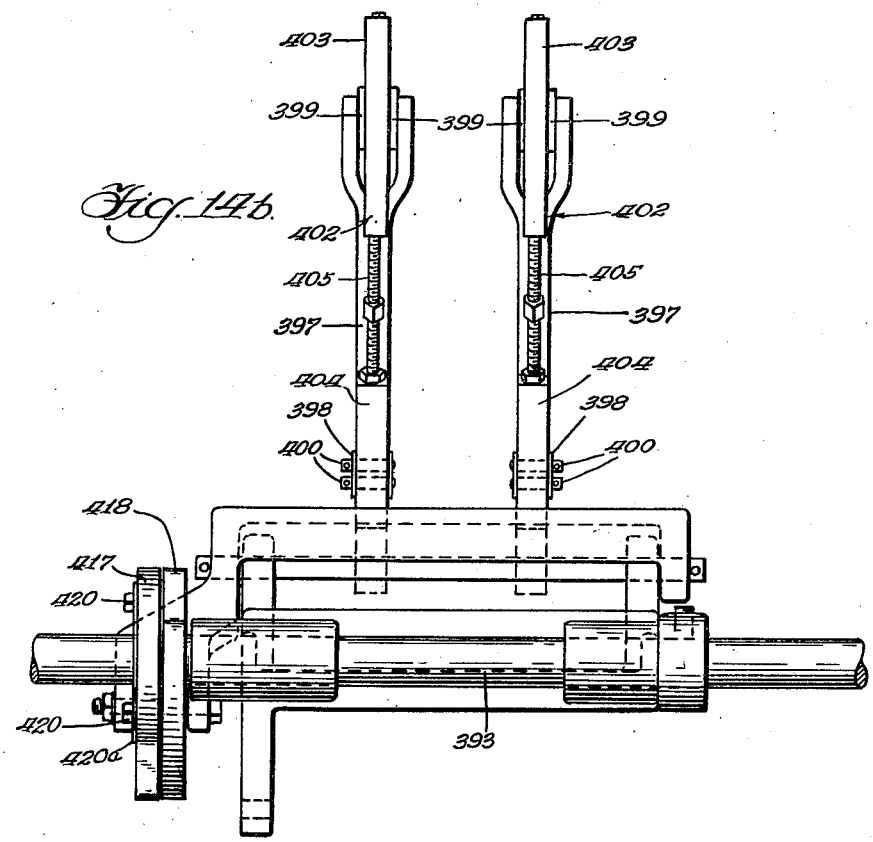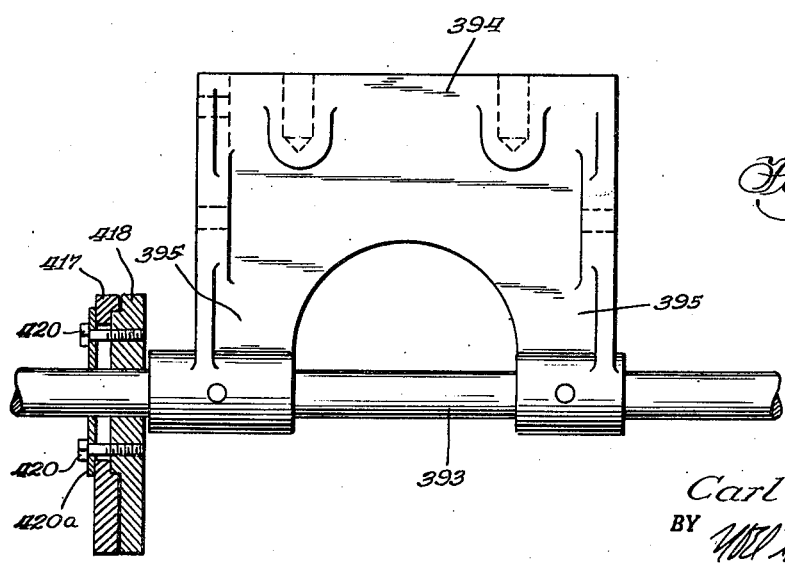

June 7, 1955  C. W. MOTT  2,709,836
MACHINE FOR MAKING SURGICAL SPONGES
Filed Nov. 20, 1948  14 Sheets-Sheet 11
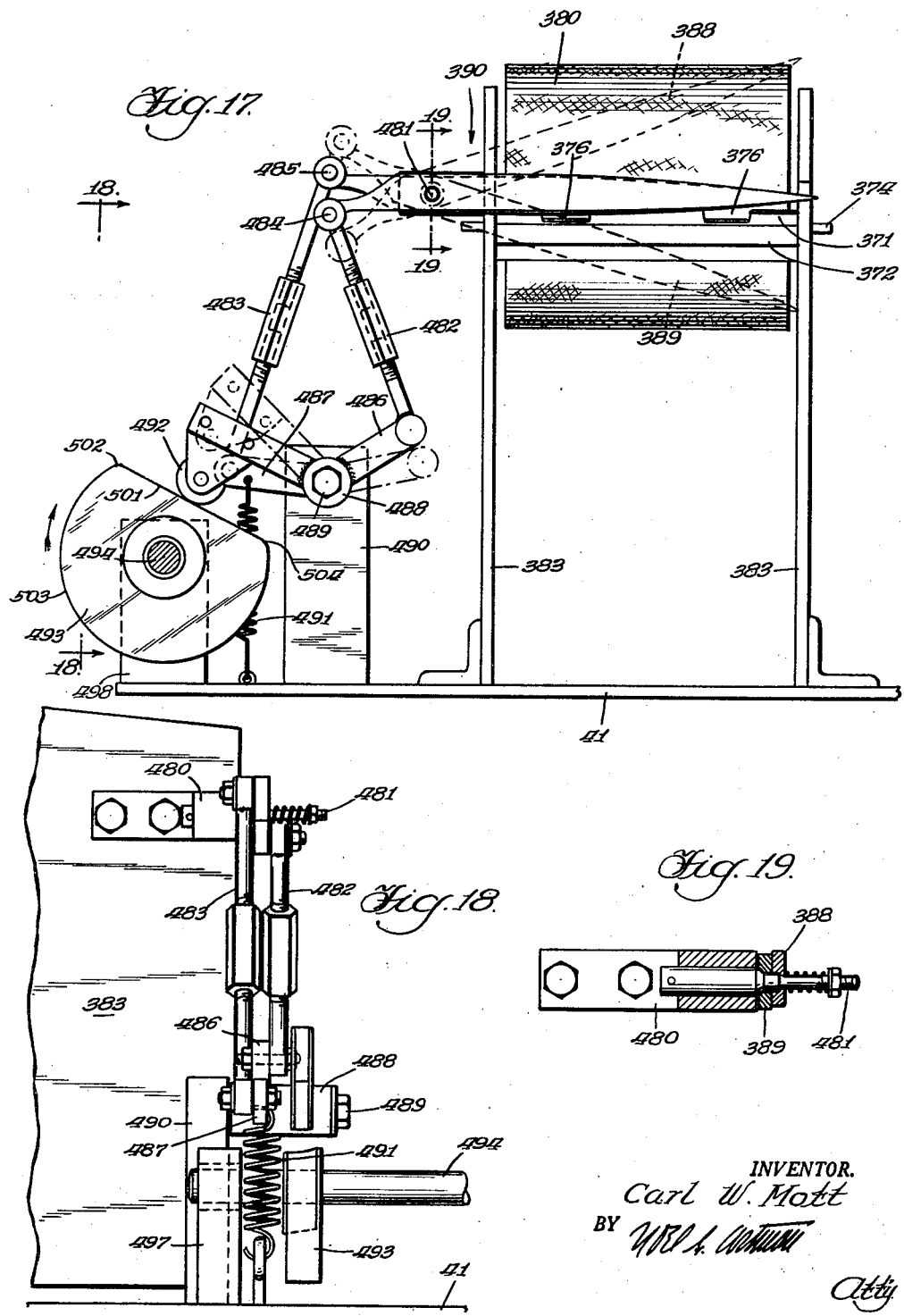
INVENTOR.
Carl W. Mott June 7, 1955     C. W. MOTT     2,709,836
MACHINE FOR MAKING SURGICAL SPONGES
Filed Nov. 20, 1948     14 Sheets-Sheet 12
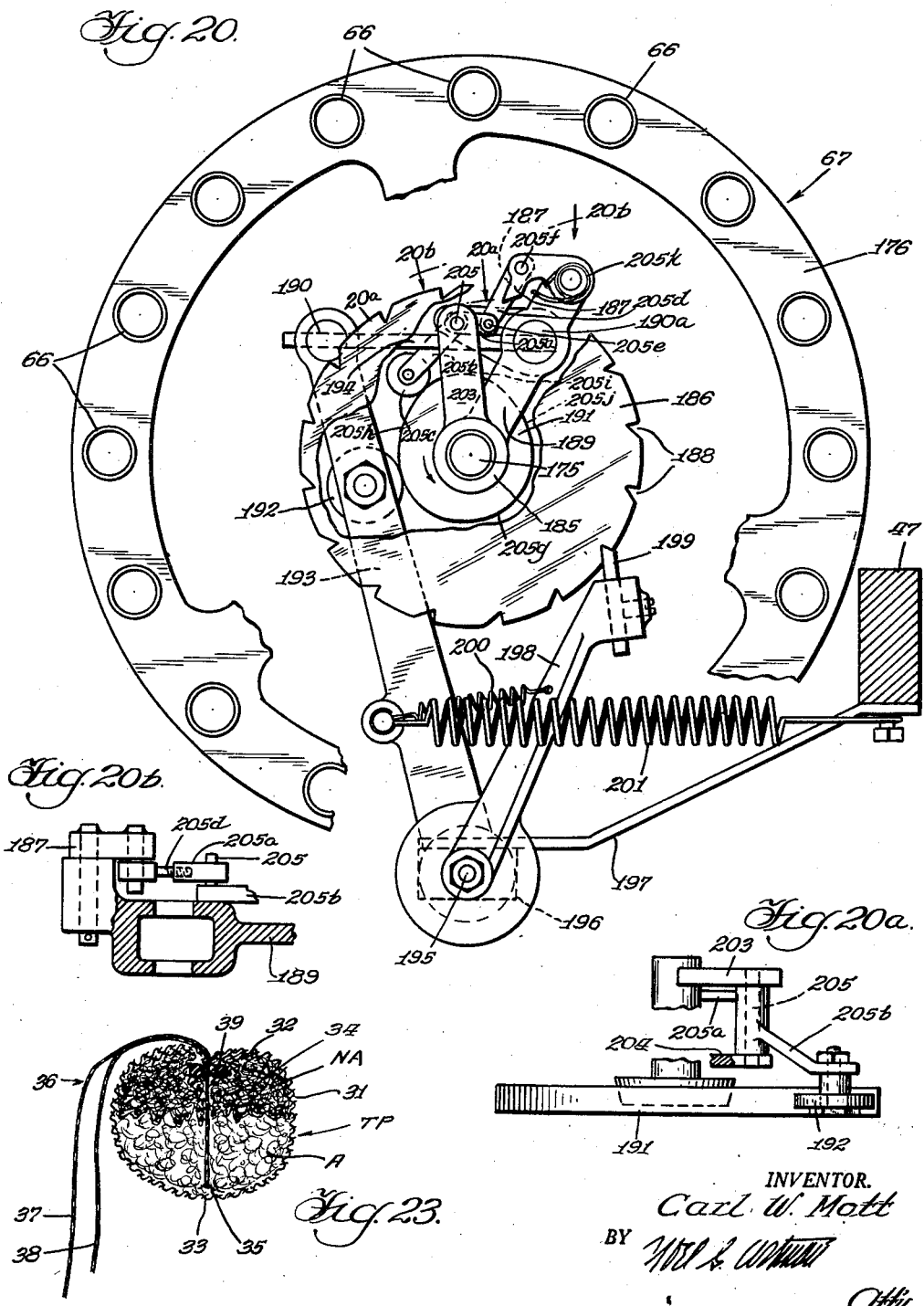

June 7, 1955  C. W. MOTT  2,709,836
MACHINE FOR MAKING SURGICAL SPONGES
Filed Nov. 20, 1948  14 Sheets-Sheet 13

INVENTOR.
Carl W. Mott
BY
Atty.

June 7, 1955 C. W. MOTT 2,709,836
MACHINE FOR MAKING SURGICAL SPONGES
Filed Nov. 20, 1948 14 Sheets-Sheet 14
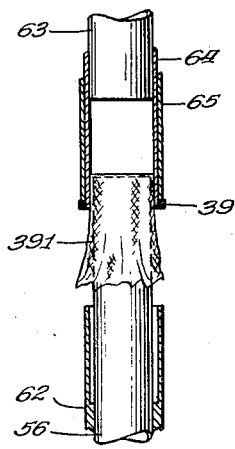
Fig. 24.
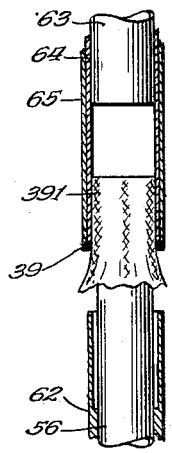
Fig. 25.
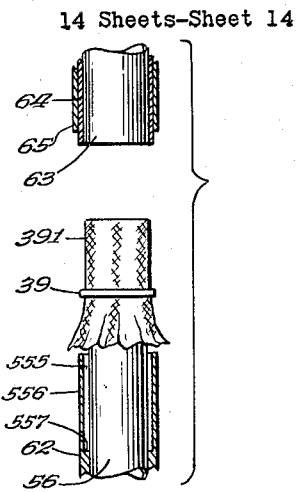
Fig. 26.
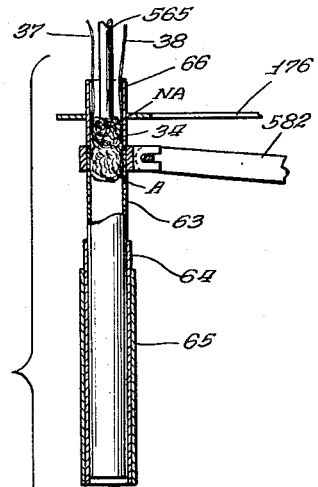
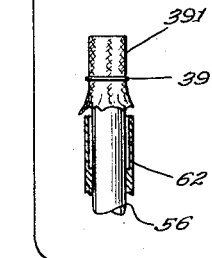
Fig. 27.
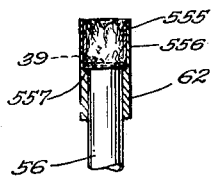
Fig. 28.
Fig. 29.
INVENTOR.
Carl W. Mott
BY
Atty.

United States Patent Office 2,709,836
Patented June 7, 1955

2,709,836

MACHINE FOR MAKING SURGICAL SPONGES

Carl W. Mott, Lake Ozark, Mo., assignor, by mesne assignments, to The Kendall Company, Boston, Mass., a corporation of Massachusetts Application November 20, 1948, Serial No. 61,224

19 Claims. (Cl. 19—144.5)

This invention concerns apparatus for making surgical sponges of a type including a fibrous filling material encased in a porous covering which is formed from a flat swatch of gauze or the like shaped into a sack with a neck turned inwardly of such sack where it is circumscribed and retained by an elastic band contracted thereonto and also enclosed in the sack. The invention also contemplates novel steps in the process of handling constituents of such sponges pursuant to bringing them together for assembly. Basic apparatus for making a sponge of the type mentioned is described in detail in my copending application Serial No. 721,410 filed January 10, 1947, now abandoned, for Surgical Sponge and Method of Making Same. Said copending application also shows details of the sponge.

The herein illustrated embodiment of the mechanical phase of the invention is a commercially usable machine capable of sustained operation at a speed producing 70 to 75 sponges (sometimes called tampons and so referred to herein frequently) per minute. Said machine is self-feeding of materials supplied thereto. A rolled up gauze strip, loaded into the machine, is payed out endwise by a gauze feeding mechanism which cuts the strip into pieces of suitable length and introduces such pieces into a tampon assembly section of the machine. A cotton strip feeding mechanism advances one or more cotton strips into the machine and cuts such strip or strips into short lengths which are also fed into the assembly section in timed relation with the pieces of gauze for assembly therewith. A rubber band forming and feeding mechanism advances a rubber tube endwise into the machine and cuts transverse sections from this tube to form rubber bands which are then transferred into the tampon assembly section of the machine for assembly with said pieces of gauze and cotton into the tampons. Still another section of the machine constitutes string feeding mechanism which draws string endwise thereinto and cuts such string into short lengths which are then introduced as withdrawal strings into the tampon assembly section of the machine for respective assembly into the structure of the tampons.

The general object of this invention is the provision of the aforesaid gauze feeding mechanism, cotton strip feeding mechanism, rubber band forming and feeding mechanism and the string feeding mechanism, together with means for operating these mechanisms in timed relation to attain their cooperation with one another and with the tampon assembly section of the machine, to obtain an efficient tampon producing unit.

Further objects are to provide novel and improved mechanisms for performing the separate functions above described.

These and numerous specific objects inherent in and encompassed by the invention will be more readily comprehended from the ensuing description, the appended claims and the annexed drawings, wherein:

Fig. 3 is a side elevational view directed at the left side of the machine as it is viewed in Fig. 1.

Fig. 4 is an enlarged elevational view, taken on the line 4—4 of Fig. 3, showing certain parts of the machine which are adapted to feed a rubber tube by intermittent endwise movement and to sever the tube transversely into rubber rings or bands, and to present these rubber bands for transfer therefrom into a tampon forming section of the machine.

Figs. 4a, 4b and 4c are sectional views taken respectively on the lines 4a—4a, 4b—4b and 4c—4c of Fig. 4.

Fig. 5 is an elevational view partly in section illustrating tampon assembling mechanism of the machine together with operating means therefor.

Fig. 5a is an enlarged fragmentary view showing details of the lower end of a tampon assembly tube.

Fig. 6 is a plan view taken at the center of the machine and illustrating rubber band transferring mechanism for transferring the rubber bands from the cutting and feeding mechanism therefor to the tampon assembling mechanism.

Fig. 6a is a fragmentary elevational view showing an end portion of a shaft which supports one of two rubber band picker fingers of the rubber band transferring mechanism.

Fig. 6b is a view looking downwardly on the shaft portion of Fig. 6a and also showing a slidable sleeve and complemental rubber band picker finger thereon.

Fig. 7 is an elevational view taken on the line 7—7 of Fig. 6.

Figs. 8, 9, 10, 11, 11a and 11b fragmentarily illustrate a lower end portion of a rubber band receiving tube of the tampon assembling mechanism, together with rubber band transferring fingers at respective successive stages in their operation of depositing a rubber band onto such tube.

Fig. 12 is a vertical sectional view on an enlarged scale illustrating an air-suction conduit through which the assembled tampons are discharged, the view illustrating the conduit in a disassembled condition which facilitates disharge of the tampon in a downward direction.

Fig. 13 is an elevational view showing a part of the machine for feeding a strip of tampon filling material and cutting it into short lengths pursuant to loading such lengths into open-ended magazines of a turret which transfers the lengths of filling material into the tampon assembling mechanism.

Fig. 13a is a view looking downwardly at the line 13a—13a in Fig. 13.

Fig. 13b is a view on the line 13b—13b of Fig. 13a.

Fig. 13c is a view on the line 13c—13c of Fig. 13a.

Fig. 13d is a view on the line 13d—13d of Fig. 13.

Fig. 14 is a side elevational view of apparatus for pulling a length of gauze from a reel or the like to facilitate the shearing off of a swatch therefrom and thereafter feeding the swatch into the tampon assembling mechanism.

Fig. 14a is a plan view taken at the plane 14a—14a of Fig. 14.

Fig. 14b is an elevational view taken at the plane 14b—14b of Fig. 14.

Fig. 14c is a plan view of a lower casting or swingable structure which supports gauze feeding fingers.

Fig. 15 is a view taken on the line 15—15 of Fig. 14, illustrating a plurality of cams, cam followers and linkage operated thereby for controlling the gauze feeding mechanism.

Fig. 16 is a fragmentary sectional view taken on the line 16—16 of Fig. 14, illustrating the fabricated structure of a cam.

Figure 2:
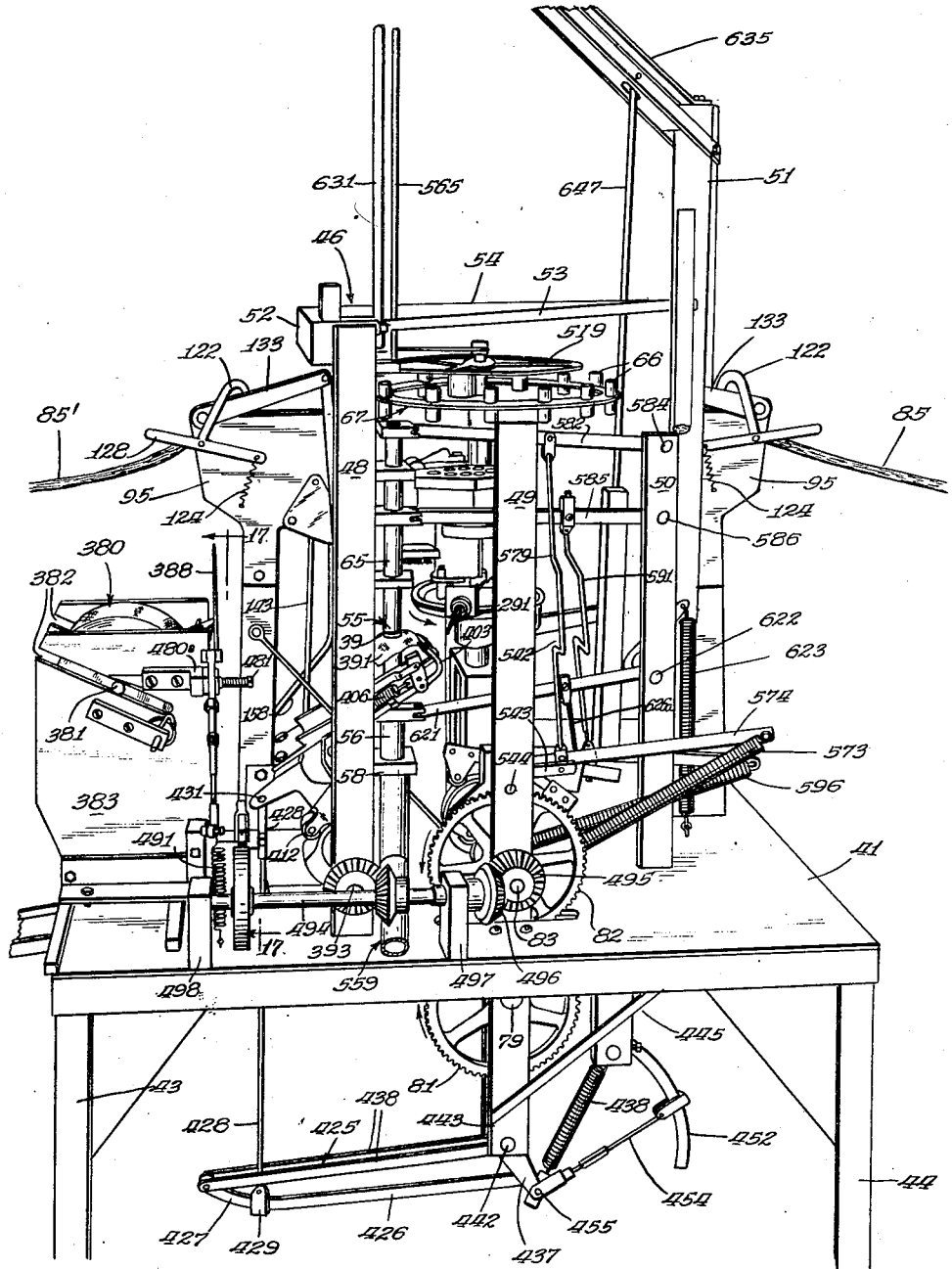
Fig. 2 is a perspective view showing the right side of the machine as it is viewed in Fig. 1.

Fig. 17 is a vertical view taken on the line 17—17 of Fig. 2, illustrating gauze-cutting shears and driving means therefor.

Fig. 18 is an elevational view taken on the line 18—18 of Fig. 17.

Fig. 19 is a sectional view taken on the line 19—19 of Fig. 17.

Fig. 20 is a plan view of the filling material feeding turret of which a central portion is broken away to expose a ratchet and pawl type of intermittent drive means therefor.

Figs. 20a and 20b are fragmentary elevations, with parts broken away for clarity, taken approximately on the lines 20a—20a and 20b—20b, respectively in Fig. 20.

Figure 21:
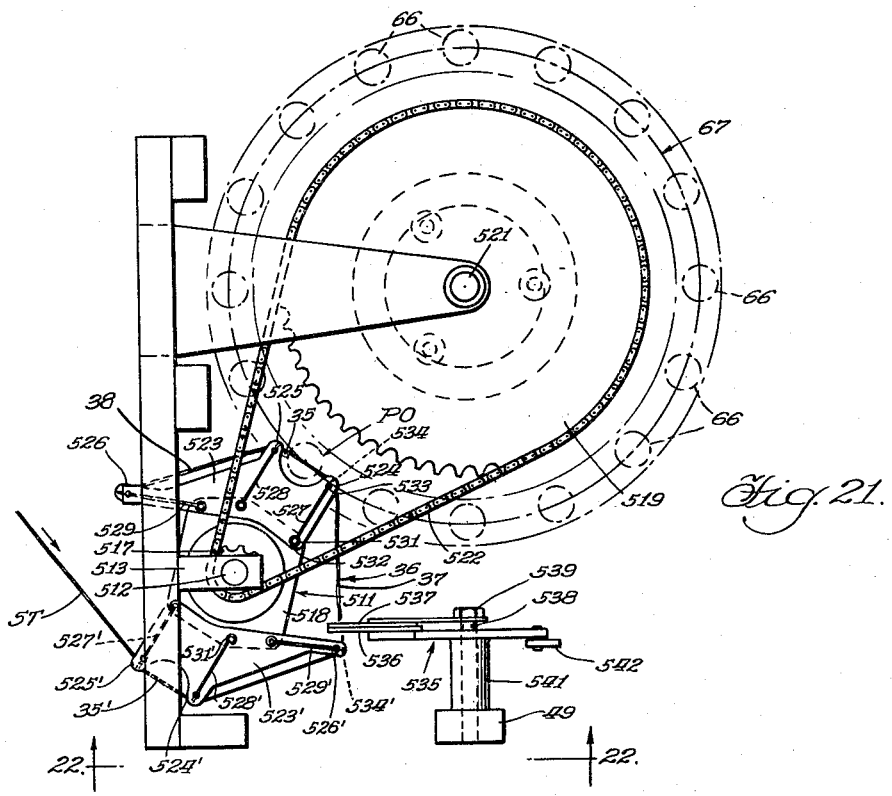

Fig. 21 is a plan view illustrating string feeding mechanism which is adapted to pull a long string into the machine and to cut the same into suitable lengths which are introduced into the tampon assembling mechanism.

Figure 22:
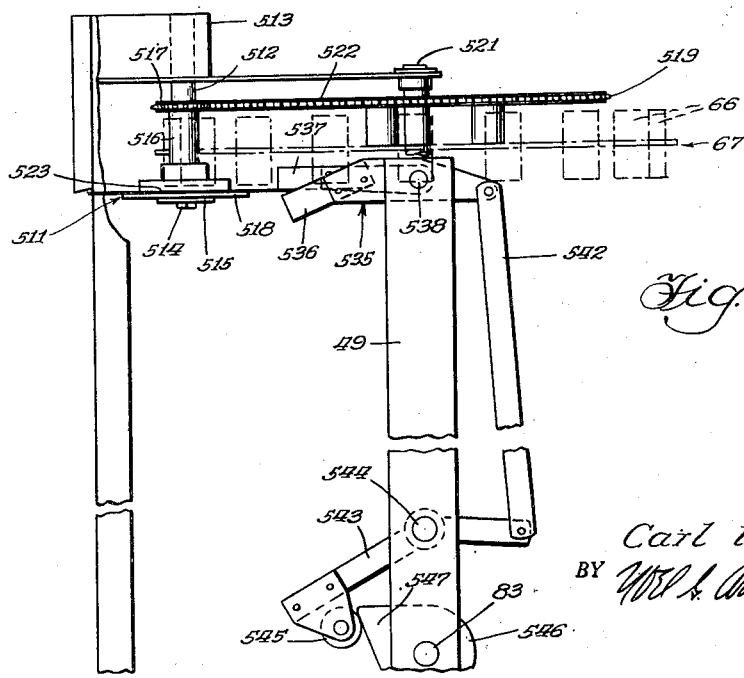

Fig. 22 is an elevational view taken on the line 22—22 of Fig. 21.

Fig. 23 is a sectional view taken at a plane coincident with the principal axis of a tampon produced by the machine.

Figs. 24 to 29 are fragmentary elevational views, partly in section, showing the tampon assembly tubes in successive stages of operation.

*Product produced by the machine*

One type of tampon adapted to be produced by the machine is illustrated in Fig. 23. This tampon comprises a gauze jacket 31 formed of an initially flat rectangular piece of gauze. In the process of forming the tampon, edge portions 32 of the flat piece of gauze are turned upwardly with respect to the central lower portion 33 whereby a sack-like jacket is formed for receiving a charge of filling material 34. This filling material is ordinarily loose heterogeneously arranged cotton fibers. Prior to charging the filling material 34 downwardly into the sack the bight 35 of a string 36 which is draped in the shape of a U is placed beneath the filling material charge so that the bight portion of the string is forced downwardly into the sack-like jacket and embraces such charge as illustrated in Fig. 23. End portions 37 and 38 of the string are sufficiently long to project outwardly through the neck of the sack-like jacket. Prior to insertion of the filling material 34 and string 36 into the sack-like jacket, the neck of the sack is caused to be circumscribed by an elastic band 39 in a fashion that when this band is later permitted to contract, it will close the neck of the sack and will be disposed internally of the jacket.

*Machine frame structure and disposition of the tampon assembling mechanism therein*

Figure 1:
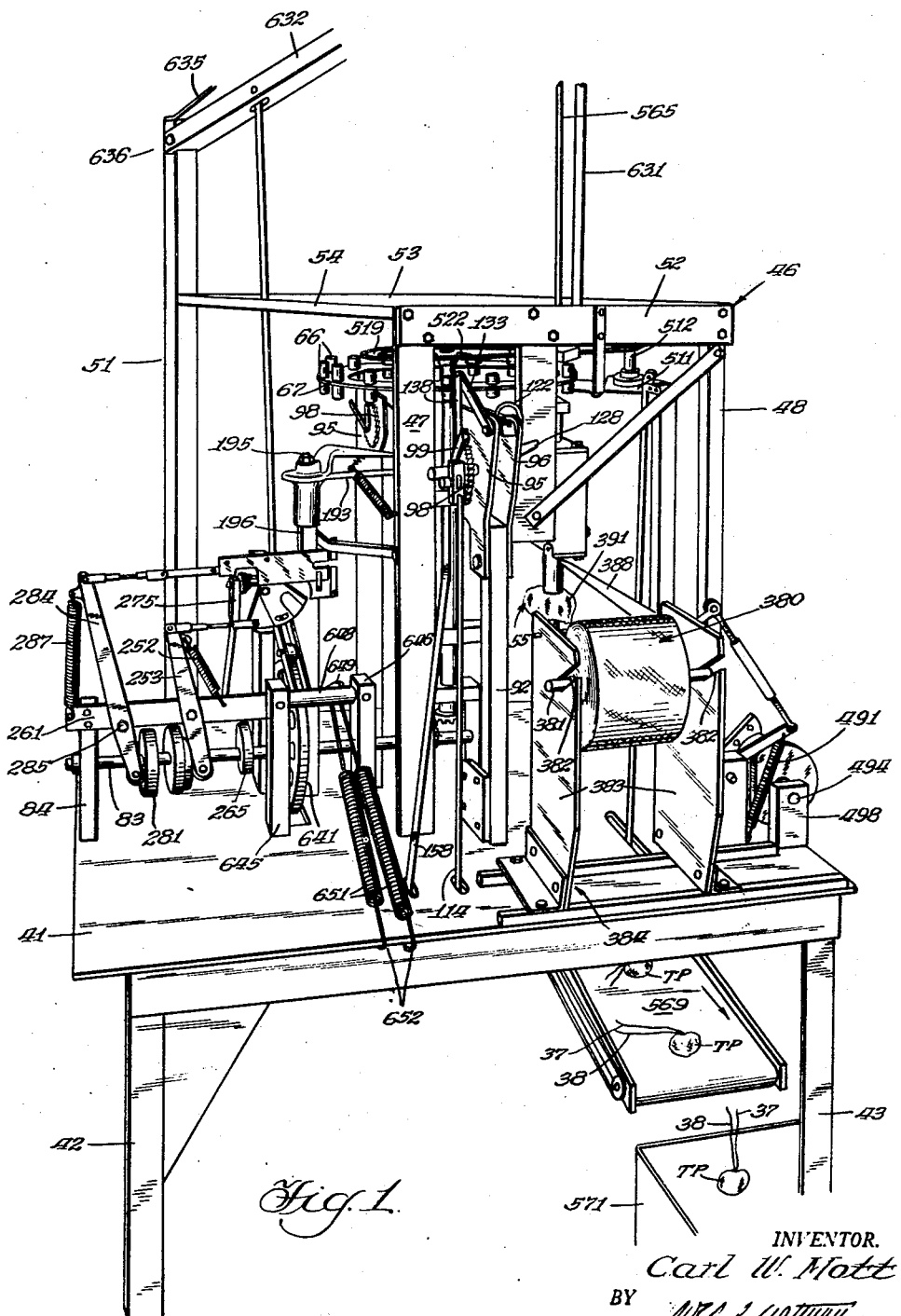
Fig. 1 is a perspective view of a machine constituting a preferred form of the invention, this view being taken from the front of the machine.

The frame of the machine comprises a table-like structure having a horizontal metal top plate 41, Figs. 1, 2, and 3, which is substantially square. There are four legs projecting downwardly from the respective corners of the top plate 41, these legs being designated 42, 43, 44, and 45. Leg 42 is at the front left side of the machine whereas the leg 43 is at the right front side of the machine as shown in Fig. 1. In Fig. 2 it can be seen that the leg 44 is at the right rear side of the machine as the machine would be viewed in Fig. 1; and in Fig. 3 it can be seen that the leg 45 is at the left rear side of the machine as it would be viewed in Fig. 1. A superstructure 46 of the frame is mounted upon the table top 41. This superstructure comprises a plurality of uprights 47, 48, 49, 50, and 51. These uprights are metal bars. The upper ends of the uprights 47 and 48, Fig. 1, are joined by a cross member 52 whereas a cross member 53 connects upper portions of the uprights 48 and 51, and a cross member 54 joins the uprights 51 and 47.

A tampon assembling mechanism 55, disposed in the machine frame at the position ascertainable from Figs. 1 and 2 and shown in vertical section in Fig. 5, comprises a plurality of coaxial tubes some of which are slidable telescopically with respect to others. An inner lower tube 56 communicates through and is mounted in a hole 57 of a small horizontal plate 58 shown in detail in Figs. 5 and 12. The plate 58 covers the upper end of a suction chamber 59 which communicates downwardly through a hole 61 in the table top 41; see Fig. 12. The inner lower tube 56, an outer lower tube 62, Fig. 5, an inner upper tube 63 and relatively axially slideable tubes 64 and 65 surrounding the tube 63 all cooperate in a manner hereinafter described for assembling the tampons.

The upper end of the tube 63 is adapted to be successively registered with by vertical filler material carrying tubes or carriers 66 rigidly mounted in equal spaced relation circumferentially about a turret 67. This turret which is mounted centrally in the machine for intermittent movement about a vertical axis is for transferring pieces of tampon filler material into registration with the upper end of the tampon assembling mechanism tube 63, Fig. 5. The gauze for forming the tampons is fed piece by piece into the space between the lower ends of the tubes 63, 64, 65, and the upper end of the tube 56. The rubber bands are successively transferred from the rubber band forming mechanism onto a lower end portion of the central upper tube 64. This feeding of the filling material to the upper end of the tube 63 and the feeding of the gauze swatches and rubber bands into an intermediate portion of the tampon assembling mechanism 55 occurs in timed relation with the operation of the tampon assembling mechanism as will be hereinafter explained.

*Driving motor and power transmitting elements*

Driving force for the various moveable parts of the machine is obtained from an electric motor 71, Fig. 3, which is mounted on the underside of the table top 41. A pulley 72 on the armature shaft of the motor drives a belt 73 which in turn drives a pulley 74 which is mounted on a shaft 75 for rotating the same. Shaft 75 carries a small sprocket 76 which is constrained for rotation therewith, and this sprocket is operable through a chain 77 for driving a large sprocket 78 which is mounted on and drives a shaft 79 carried in suitable bearings on the underside of the table top and extending completely across the machine, one end of the shaft 79 appearing in Fig. 3 and the opposite end thereof in Fig. 2. A gear 81, Fig. 2, adjacent to the right end of the shaft 79 is constrained for rotation with the shaft and is meshed with a gear 82 which is mounted on and for rotation with a shaft 83 closely above the table top 41. Shaft 83 is journaled in a lower end portion of the frame upright 49, Fig. 2, and extends completely across the machine where the opposite end thereof is journaled in a short upright bearing standard 84, Figs. 1 and 3. The cross shafts 79 and 83 carry various gears and cams which will be specifically referred to hereinafter.

*Cotton strip feeding and cutting mechanism*

There are two essentially identical cotton strip feeding mechanisms for feeding respective strips of cotton. One of these mechanisms is at the rear side of the machine for feeding a cotton strip 85 and the other mechanism is at the front of the machine for feeding a strip 85'. Only the rear mechanism will be described in detail, and corresponding parts of the front mechanism will be indicated by the same respective reference characters plus a prime.

The rear cotton strip feeding mechanism is adapted to pull the cotton strip 85, Fig. 3, endwise into the machine. A coil of the strip 85 in a receptacle 86 is pulled endwise upwardly therefrom through a wire loop 87 and over a small pulley 88 rotatable on a bearing 89 supported at the outer end of a bracket 91 which projects rearwardly from the frame superstructure 46.

This cotton feeding mechanism is supported upon the upper end of a standard 92 which is mounted upon the table top 41 by a pair of laterally spaced plates 93 (one being shown in Fig. 3) and a metal block 94 anchored to the table top. A pair of identically shaped laterally spaced plates 95 and 96, Fig. 13a, are secured at their lower ends to respective sides of the standard 92 adjacently to its upper end. A short shaft 97 extends between and through the plates 95 and 96 wherein it is journalled. A section of the shaft 97 outwardly from the plate 95 carries a ratchet wheel 98 which is constrained for rotation therewith. A pair of arms 99 and 101 are oscillatable upon the shaft 97 but are connected together for oscillation in concert. The arm 101 carries a spring pawl 102 cooperable with the teeth on the ratchet wheel 98 for causing step by step clockwise rotation of the ratchet wheel pursuant to oscillation of the arms 99 and 101. Such oscillation of the arms 99 and 101 is obtained by force received from a spring 103 shown in the lower part of Fig. 13 and under control of a cam 104 which is constrained for rotation with the constantly rotating shaft 79. One end of this spring is anchored to the machine frame at 105 so the tendency of the spring to contract urges a bell crank 106—107 to pivot clockwise about a pivot pin 108 carried in a bracket 109 depending from the underside of the table top 41. An arm 111 projecting forwardly from the hub of the bell crank carries a cam follower roller 112 which rolls upon the profile of the cam 104. This cam has a circular profile excepting for a lobe 113. Each time the cam lobe 113 passes beneath the roller 112 the bell crank 106—107 will be pivoted counter-clockwise and is thereby operable through a vertical link 114 for pivoting the arms 99 and 101 counter-clockwise and ratching the pawl 102 over the serrated periphery of the wheel 98. When the cam lobe 113 passes from beneath the roller 112 the spring 103 pivots the bell crank for pushing the rod 114 upwardly and causing the pawl 102 to advance the serrated wheel 98 a distance regulatable by adjusting the distance that a connecting yoke 115 is spaced on the arm 99 from the axis of the shaft 97. Retrograde movement of the ratchet wheel 98 subsequent to each advancement is prevented by a spring pawl 116 anchored at 117 to the plate 95.

Referring now to Figs. 13b and 13c, there is shown a wheel 118 fixed upon the shaft 97 between the plates 95 and 96. This wheel has a layer 119 of rubber or other suitable friction material upon its circular periphery. A metal pressure strip 121 is pressed downwardly toward the upper side of this wheel by the lower end of a hook-shaped arm 122, Figs. 13a, 13b, and 13c. This arm is rigidly connected with a lever 123 of which one end is urged downwardly by a contraction spring 124 having its lower end anchored to the plate 96. A pivot pin 125 for the lever 123 is also anchored in the plate 96. A hooked rear end portion 126 of the pressure strip 121 is pivotally associated with a supporting pin 127. By pressing downwardly upon a handle portion 128 of the lever 123, the lower free end of the hook-shaped arm 122 can be caused to release its pressure from the pressure strip 121, facilitating manual lifting of the hooked-shaped end 126 of the pressure strip whereby the cotton strip 85 can be introduced endwise into position between such pressure strip and the wheel 118. Thereafter when the lever 123 and the rear end of the pressure strip 121 are released the cotton strip will be grasped firmly between the smooth undersurface of the pressure strip and the friction material 119 circumscribing the wheel 118. Consequently the intermittent rotative motion of the cotton strip feeding wheel 118 will cause the cotton strip to be precisely advanced.

Means for cutting off intermittently advanced lengths of the cotton strip 85 comprises an anvil plate 129 mounted on the front edges of the laterally spaced plates 95 and 96 and a cooperating knife 131 having a sharpened lower edge 132 extending horizontally in parallelism with the upper end of the anvil plate. This knife is mounted rigidly on the front ends of two arms 133 which project pivotally forwardly from opposite end portions of the pivot pin 127 mounted in the plates 95 and 96. A pair of links 135 are pivotally connected with the front ends of the arms 133 by a pin 136 extending therebetween, and these links 135 are adjacently to the outer sides of the plates 95 and 96, respectively. The lower ends of the links 135 are pivotally connected with lower forward corner portions of congruent laterally-spaced triangular plates 138 by means of a pivot pin 137 anchored in and extending between these plates. The plates 138 which are conveniently referred to as a bell crank straddle the plates 95 and 96 and are pivotally connected therewith a cross pin 141. A pivot pin 142 extending between upper corners of the bell crank plates 138 serves as a connection for the upper end of a turnbuckle rod 143 which is for transmitting oscillative motion to such plates.

The lower end of the adjustable rod 143 is pivotally connected with an arm 144 of a bell crank 144–145 having a cam follower roller 146 mounted on an arm 147 and cooperable with a cam 148 which is constrained for rotation with the shaft 79. Bell crank 144–145 is oscillable on the shaft 108. Arm 145 of the bell crank 144–145 is connected with a spring 149 which tends to pivot the bell crank clockwise. Only so long as a mid portion of the straight profile 151 (presented upward in Fig. 13) registers with the follower 146 will a spring 149 be able to hold the bell crank 144–145 clockwise for holding the rod 143 and the knife 131 upwardly. As the cam 148 is rotated counterclockwise, a corner 152 between the profile 151 and a long radius profile 153 will eventually pass the roller 146 and cause this roller to rise and operate the bell crank 144–145, the link 143 and the bell crank 138 for lowering the knife 131 into cutting relation with the anvil bar 129. It will be noted that as the cutting edge 132 of the knife approaches the anvil bar, the force arm with which the rod 143 acts upon the bell crank 138 will be substantially maximum length and that the pin 137 will be carried nearly horizontally by the bell crank wherefore considerable mechanical advantage is developed through the use of the bell crank for multiplying the force with which the cam 148 can press the knife edge 132 against the anvil bar.

At the time the knife is lowered into cutting relation with the anvil bar, a short length of the cotton strip will have been advanced forwardly beyond such bar into a position cradled by upwardly diverging flanges 154 integral with a sheet metal bracket 155 secured to the front face of the anvil bar; see Fig. 13d. Subsequent to descent of the knife edge 132 onto the anvil bar and the consequent cutting off of the short length of cotton, this length of cotton will remain upon the cradle flanges 154. Immediately thereafter a short poker rod 156 will be elevated endwise between the cradle flanges against the cut-off length of cotton strip and charge the same onto one of the turret tubes or carriers 66 which will then be vertically registered therewith. The poker rod is mounted upon a horizontal arm 157 which is secured to a vertical upper end portion of a reversely bent generally upright rod 158. The vertical upper end portion of the rod 158 is slideable endwise in a bearing hole 159 bored diametrically through a cylindrical stud 161 having its left end anchored in an upright frame member 162 of which a portion is cut away for exposing details of the rod 158 and of the bell crank 138.

The lower end of the reversely bent rod 158 is pivotally connected with a rear end portion of a bell crank 163–164 which is pivoted on the rod 108. An arm 165 which projects from the hub of the bell crank 163–164 carries a cam follower roller 166 cooperable with the profile of a cam 167, Fig. 13, having a long radius profile 168.

A spring 169 acts upon the bell crank arm 164 for urging the cam follower 166 against the profile of the cam 167 and for urging the rods 158 and 156 upwardly. The cam profile 168 passes from registry with the cam follower 166 to permit the spring 169 to pivot the bell crank 163–164 and force the rods 158 and 156 upwardly to poke the cotton into the registered turret tube 66 immediately after the piece of cotton disposed in the cradle plates 154 has been cut off from the main cotton strip.

*Turret and intermittent driving means therefor*

The turret 67 is shown from the side in Figs. 1, 2 and 3, and is shown in plan in Fig. 20. A vertical shaft 175 for supporting and transmitting driving motion to the turret appears in side elevation in Fig. 7. An annular plate 176, Figs. 1, 2 and 20, of the turret is arranged coaxially with the shaft 175. Shaft 175 extends upwardly through a sleeve 177 in which it is journaled, the sleeve being supported within holes 178 of frame cross members 179 supported upon frame uprights 181 and 182, Fig. 7. These uprights 181 and 182 rest at their lower ends upon the table top 41. Constant rotation is imparted to the vertical shaft 175 by companion beveled gears 183 and 184 which are respectively constrained for rotation with the cross shaft 83 and the shaft 175.

The central portion of the turret plate 176 rests upon the upper end of a rotatable sleeve 185, Fig. 3, which is carried by the shaft 175. This sleeve 185 projects upwardly from the ratchet wheel 186 Figs. 3 and 20. A cam-controlled pawl 187 cooperable with notches 188 in the circular periphery of the ratchet wheel is pivotally carried upon the outer end of an arm 189 which is oscillative about a section of the shaft 175. Oscillation of the arm 189 is obtained by means of a cam 191, a cam follower roller 192, arm 193 upon which the roller 192 is mounted, and an adjustable link 194 interconnecting the arms 193 and 189 by means of pivot pins 190 and 190a into which opposite ends of the link extend diametrically. One end of the arm 193 is pivotally supported upon a vertical rod 195 which is held by a socket 196 carried by a frame member 197, Fig. 20. Also pivotally projecting from the bearing rod 195 is a sprag arm 198 adjustably carrying a sprag element 199 which is adapted to engage successively in the ratchet wheel notches 188 for preventing back-up of the ratchet wheel and turret incident to each retrograde motion of the pawl 187. A light spring 200 connected between the two arms 193 and 198 retains the sprag 199 against the periphery of ratchet wheel 186, whereas a spring 201 urges the arm 193 to hold the cam follower 192 against the cam 191. Thus the spring 201 maintains the follower 192 against the profile of the cam 191 to cooperate with this cam in causing oscillatory motion of the arm carrying pawl 187.

Means is provided for supplementing the sprag 199 in preventing rotative vibration and dislocation of the turret following each motion cessation of the turret in its step by step advancement. This supplementary means comprises vertically spaced arms 203 and 204, Figs. 20 and 20a, projecting outwardly from the hub 185 and arm 189. A vertical pin 205 carried between these two vertically spaced arms serves as a pivotal mount for the hub of a bell crank 205a—205b. The arm 205b of this bell crank carries a cam follower roller 205c cooperable with the cam 191 whereas the other arm 205a is connected by a link 205d and pivot pins 205e and 205f with the pawl 187. While the short radius dwell portion 205g of the cam 191 is still in registration with the cam follower 192 so that the spring 201 retracts the arms 193 and 189 clockwise as viewed in Fig. 20 to place the pawl 187 in a notch of the ratchet wheel 186 preparatory to this ratchet wheel being advanced, the rising profile portion 205h of the cam profile will pass beneath the cam follower 205c and eventually the long radius profile portion 205i will move into registration with such cam follower for holding the pawl 187 in the ratchet wheel notch. Subsequent to this positive holding of the pawl 187 being established the rising profile section 205h will pass under the roller 192 for pivoting the arms 193 and 189 counter-clockwise to carry the pawl 187 with the arm 189 a distance to advance the ratchet wheel one position. When the ratchet wheel comes to rest the cam follower 205c will still be in registry with the long radius profile portion 205i of the cam 191 whereby the pawl 187 remains locked in the notch 188 which it occupied for advancing such a wheel and this positive retention of the pawl in the notch of the ratchet wheel prevents rotative vibration of such wheel and the turret so that the filling material carriers 66 of the turret will remain properly indexed. As soon as any tendency of rotative vibration of the turret and ratchet wheel ceases a descending profile portion 205j of the cam profile will pass beneath the follower 205c, permitting an anti-rattle spring 205k to pivot the pawl 187 clockwise out of the notch in the ratchet wheel periphery. Next the descending profile 205j passes beneath the roller follower 192 to permit clockwise movement of arms 193 and 189 preparatory to initiating a succeeding cycle of intermittent rotative advancement of the turret.

The notches 188 in the ratchet wheel 186 correspond in number with the number of turret filling material carriers 66, and the amount of motion imparted to the ratchet wheel and consequently to the turret is exactly enough to advance each carrier or magazine to the position occupied by the next preceding magazine before the beginning of the intermittent movement. During successive periods of rest successive carriers 66 will be caused to axially register with the upper end of the vertical tube 63 of the tampon assembling mechanism.

*Elastic band forming and feeding apparatus*

Means for forming rubber bands and feeding them into the machine for incorporating them into the structure of the tampons is shown in Figs. 3, 4, 4a and 4b. This apparatus forms the rubber bands from a rubber tube 206 which is drawn endwise by the apparatus out of a container 207 resting on the floor by the machine. An advanced end portion of the rubber tube is gripped between a pair of serrated rollers 208 and 209. The manner in which the two rollers 208 and 209 engage the rubber tube and advance it endwise across the under shearing edge of the back wall 212 of a rubber band shearing and feeding head 213 is illustrated in Fig. 4a. The rollers 208 and 209 are intermittently rotated to advance the tube 206 endwise into the shearing and feeding head a distance corresponding to the desired thickness of the rubber bands which are formed by shearing off the inwardly advanced end portion. A knife 214 is moved upwardly immediately after each advance of the rubber tube end portion into the shearing and feeding head and cooperates with the rear wall 212 for shearing off a rubber band and moving it upwardly into position P into a horizontal feeding chute 215 of such head. Subsequent to movement of the rubber band to position P, a plunger 216 is caused to move to the right as viewed in Fig. 4 for transferring the rubber band to a delivery position D. While presented at the delivery position each rubber band is entered by picking fingers 291—292, Fig. 6, of a rubber band transferring mechanism for transfer of such bands to the tampon assembling mechanism.

Referring now more particularly to the structure of the shearing and feeding head 213, it can be seen in Figs. 4a and 4b to have in addition to the rear wall 212 a front wall 217 which is preferably of a transparent plastic material. An upper side of the delivery chute 215 is formed by a plate 218 disposed between the back wall 212 and the front wall 217. A lower side of the chute 215 is formed by a plate 219 interposed between the front and back walls 217 and 212; see Fig. 4c. The plate 219 is sufficiently short lengthwise of the feeding chute 215 and provided with a curved end 220 to provide clearance for the knife 214 so that the cutting edge 221 of this knife can enter the lower side of the head 213 and move upwardly between the walls 212 and 217 to deliver the rubber band cut thereby from the tube into the position P. The right end of the walls 217 and 212 as viewed in Fig. 4 have registering horizontal notches 222 for accommodating part of the rubber band transferring mechanism. The right end of the plunger 216 also has a notch, 225, which registers with the notches 222 while the plunger is in its rightmost position. There are opposed boss-like projecting portions 223 and 224 on the right ends of the plates 218—219, as viewed in Fig. 4, to provide constricting means resisting accidental movement of the rubber bands beyond the delivery position D.

The rubber band cutting and feeding head 213 is mounted upon frame uprights 227 and 228 by bolts 229 and 231. Frame upright 227 also carries a bolt 232 for pivotally attaching the knife 214 to such upright in cooperative relation with the remainder of the head 213. The body of the knife 214 is substantially sector shaped, the upper edge 221 of the knife being its cutting edge. This cutting edge 221 of the knife lies in substantial parallelism with the lower edge of the rear wall 212 of the cutting head when the knife is in its operated counterclockwise position. Consequently, when the knife is in its retracted clockwise position, the cutting edge 221 will be arranged divergently to the lower edge of the rear wall 212 to cooperate therewith in scissor-like fashion for cutting off an end section of the rubber tube. The knife 214 has a rear or back face 234, Fig. 4a, and a forward face 235. Said back face 234 is advanced upwardly along and in opposed relation with the inner surface of the back wall 212 pursuant to cutting the end section from the band and moving such end section, after it has been cut off, upwardly toward the chute 215. The cutting edge 221 of the knife structure is formed on a line of intersection of such back face 234 with an upper beveled edge 236 of the knife body and which beveled edge extends downwardly and forwardly from such back face 234 to the forward face 235 of the knife body. A rubber band pusher element 237 disposed upon the forward face 235 of the knife body contiguously with the beveled edge 236, is also pivotally carried upon the shank of bolt 232. Said pusher element has an extension arm 238 containing an arcuate slot 239 which receives a threaded stud 241 anchored in the body of the knife and for receiving a nut, not shown, for holding the band pusher element 237 and the knife body in a selected circumferential position so that the pusher element occupies the position of contiguity with the beveled edge 236 of the knife body as illustrated in Fig. 4a. The pusher element 237 prevents a rubber band from being wedged between the diagonal or beveled edge 236 of the knife body and the front wall 217 of the cutting and feeding head subsequent to the cutting off of the rubber band and pursuant to its being moved to position P.

While the knife is in its retracted clockwise position, Fig. 4, a coil spring 242 reacting between a nut 243 on the threaded bolt shank 232 and the hub portion 244 of the pusher element 237 presses the knife body into a position causing the knife edge 221 to extend slightly diagonally across the lower edge of the rear wall 212 of the cutting and feeding head in much the same manner that the blades of scissors are disposed in slightly crossed relation while being operated, so that a traveling point of contact obtains between the shearing edges as the blades are closed. Consequently, as the edge of the knife is swung upwardly while cooperating in scissor-like fashion with the lower edge of the rear wall 212, the body of the knife and the band pusher element are cammed forwardly across the lower edge of the rear wall. This projects the forward side of the pusher element forwardly, as permitted by the spring 242, wherefore the front wall 217 of the cutting and feeding head is secured to the rear wall 212 only at upper portions by the bolts 229 and 231, and this forward wall is made resilient and flexible so that it can be displaced forwardly by the forward and upwardly moving pusher element rubbing against its back inner surface.

Pivoting of the knife 214 is obtained by the cooperative action of a cam 251 secured for rotation with the constantly rotating cross shaft 83, Figs. 1, 3 and 4, and a contraction spring 252, Figs. 1 and 4. The spring 252 urges a lever 253 to pivot clockwise for maintaining a roller follower 254 on its lower end in engagement with the profile of the cam 251. This profile includes a flat section 255 on the end of an axially projecting lobe 256, an inclined profile portion 257 leading up one side of the lobe to the flat section 255, and a drop-off portion 258 at the opposite side on the lobe 256. A fixed pivot 259 for the arm 253 is anchored in a frame member 261. The upper end of the lever 253 is connected by an adjustable link 262 with the knife 214. When the cam lobe 256 passes beneath the roller 254, the knife 214 will be pivoted clockwise for swinging its cutting edge 221 downwardly below the position in which the rubber tube is fed endwise into the cutting and feeding head, that is, into the position illustrated in Fig. 4a. Later, when the lobe 256 passes from registration with the roller 254 to allow this roller to drop to the left, as viewed in Fig. 4, along the profile portion 258, the spring 252 will pivot the lever clockwise for swinging the knife 214 counter-clockwise and thereby moving its cutting edge 221 upwardly for cutting an end portion of the rubber tube off and delivering this cut-off end portion constituting a rubber band into position P in the feeding chute 215.

While the knife was in the position illustrated, in Fig. 4a, the serrated feeding rollers 208—209 were caused to rotate an amount for advancing an end portion of the rubber tube into the cutting and feeding head preparatory to its being cut off by the subsequently pivoted knife. Intermittent rotation of the feeding rollers 208—209 in timed relation with the operation of the knife 214 is obtained by a ratchet and pawl drive 263—264, Fig. 3, which receives operating force from a circular cam 265 mounted eccentrically on the constantly rotating shaft 83, Fig. 4. A cam follower roller 266 cooperates with the cam 265 for oscillating a lever 267 having a fixed pivot 268 secured to the frame upright 227. The upper end of the lever 267 has an arm 269 secured thereto in selective angular relation by a bolt 271. The free end of the arm 269 carries a bolt 272 of which the shank 273 is movable in a slot 274 of an arm 275 pivoted relatively to and concentrically of the roller 208 with which the ratchet wheel 263 is constrained for rotation. A pair of companion gears 277—278 respectively upon the serrated shafts 208—209 cause these two shafts to rotate synchronously in opposite directions. Counter-clockwise rotation of the lever 267 as viewed in Fig. 3, caused by throw of the circular eccentric 265 toward the front side of the shaft 83 and consequent forward displacement of the follower 266, causes the pin 273 to move the pawl-carrying arm 275 for rotating the ratchet 263 clockwise by means of the pawl 264. An examination of Fig. 4 and 4a will disclose that such clockwise rotation of the ratchet 263 and of the gear 277 will cause the gear 278 to rotate counter-clockwise. Thus the two serrated rollers 208—209 will be rotated complementally for advancing the rubber tube 206 endwise toward the feeding and cutting head. The amount of endwise advancement of the rubber tube can be selectively varied by loosening the bolt 271, Fig. 4, and swinging the arm 269, Figs. 3 and 4, about the shank of the bolt 271 for changing the position of the bolt shank 273 in the slot 274 and thereby changing the position of the bolt shank 273 radially of the pivot axis for the arm 275.

A cam 281, Fig. 4, having a lobe 282 spaced radially from the axis of the shaft 83 with which said cam is constrained for rotation, is operable through a follower roller 283 and a lever 284 pivoted at 285 on the frame member 261 for causing endwise reciprocation of an adjustable link 286 and consequently of the plunger 216 for transferring rubber bands from position P to the delivery position D. Endwise movement of the plunger 216 delivering rubber bands to position D occurs pursuant to the cam lobe 282 passing beneath the roller 283. Return movement of the plunger is effected by a spring 287 connected between the arm 284 and the frame member 261.

Operating sequence of the knife 214, the intermittently rotated and serrated rubber tube advancing rollers 208—209 and of the plunger 216 is such that while the knife 214 is in its lowered position, the rollers 208—209 will be rotated in projecting a short section of the tube into the cutting and feeding head. Following this the knife 214 is swung counter-clockwise, as viewed in Fig. 4, for severing the projected end portion of the rubber tube to form the rubber band and for moving this rubber band into position P in the feeding passage 215. Thereafter the plunger 216 is moved to the right for transferring the rubber band to position D. Prior to a succeeding intermittent rotating motion of the tube feeding rollers 208—209 the knife 214 will be swung clockwise to make room for a succeedingly advanced end portion of the tube, and prior to subsequent cutting movement of the knife 214 the plunger 216 will be retracted preparatory to making a succeeding band-delivery excursion. This cycle of operation of the parts in the rubber band forming and feeding mechanism is continuously repeated during operation of the machine.

*Rubber band transferring apparatus*

The apparatus for transferring rubber bands from the delivery station D of the rubber band forming and feeding mechanism shown in Fig. 4 is disclosed in detail in Figs. 6 to 11b inclusive. This apparatus includes a pair of separable picking fingers 291—292 which, while moved together as illustrated in Fig. 6, enter into a rubber band at the delivery station D of the rubber band forming and feeding apparatus. In this manner the picking fingers hook such rubber band (the term "rubber band" being used herein and in the appended claims to denote a band of any elastic material) and sweep it from the delivery section of the apparatus in Fig. 4. After thus picking the rubber band, the fingers are spread apart while moving in a circular path about the axis of the shaft 175. This path is represented by the dot-dash line 293 in Fig. 6.

Spreading of the fingers 291—292 stretches the rubber band, and while it is in the stretched condition these fingers are operated in a manner presently described and as illustrated in Figs. 8 to 11b to deposit the rubber band on the lower end of the tube 64 of the tampon assembling mechanism. After depositing the rubber band on the tube 64 the picking fingers continue their movement about the circular path 293 and are again closed together preparatory to picking up another rubber band at the delivery station D in Fig. 4.

The outer picking finger 291, projects laterally from a plate 294 mounted on a flat face 295 upon an end portion of a shaft 296 by a pair of screws 297 see Fig. 6a. A shoulder 298 is formed at the root portion of the finger 291 to limit the distance a rubber band may be inserted thereonto. A fin-like projection 299 projects endwise from the plate 294 to assure removal of the rubber bands from the delivery station D in Fig. 4. The face 295 on the shaft 296 is so disposed with respect to the longitudinal axis of the shaft that such axis coincides with the longitudinal axis of the plate 294. The picking fingers 291—292 are, of course, disposed eccentrically of such axis and project radially therefrom. Shaft 296 is carried rotatively and endwise movably within a bearing 301 passing diametrically of the upright shaft 175 and through a metal block 303 welded to and interposed between upper and lower portions of said shaft for rotation therewith. A squared section 304 of the shaft 296, Figs. 6a and 6b, reciprocally carries a sleeve 305 to rotate therewith, whereas the collar 307 which is constrained against rotation is operable for shifting the sleeve endwise upon the shaft 296.

An axial slot 308 in a flange 309 at one side of the groove 306 receives an end portion of a plate 310 which has the finger 292 formed integrally therewith. That portion of the finger-carrying plate 310 disposed in the slot 308 is connected to the flange 309 by brazing.

Intermittent rotative movement is imparted to the shaft 296 by a pinion 311 slidably mounted upon a squared right end portion of the shaft as viewed in Fig. 6. This pinion is constrained against endwise movement by arms 316—317 which project laterally from a metal bar 318 projecting endwise from the block 303 upon which it is suitably mounted. Pinion 311 cooperates with the toothed portion 319 of mutilated ring gear 321 which has a hub 322, Fig. 7, secured non-rotatively upon the non-rotatable bearing sleeve 177. Said hub 322 has an axial split, not shown, passing between apertured ears 323. The axially aligned apertures 324 in these ears are adapted to receive a bolt which together with a threaded nut, not shown, on the end thereof is adapted to draw the two apertured ears together into clamped relation onto the non-rotatable bearing sleeve 177. The shank of said bolt registers tangentially with and extends into a circumferential groove 325 in the sleeve 177 to key the hub 322 against endwise movement on such sleeve.

A cam groove 326 formed in the upper face of the body of the gear 321 circumscribes the vertical axis of such stationary gear as shown in Fig. 6. This cam groove has a "rise" portion 327 extending between a "low" portion 328 and a "high" portion 329. A "fall" portion 331 of decreasing radius extends between the "high" and "low" portion.

Cam groove 326 receives a cam follower roller 332 depending from the under side of a plate-like lever 333 which is pivotally mounted on a fixed pivot in the form of a pin 334 anchored in and projecting upwardly from the metal block 303. One end of the lever 333 is pivotally connected at 335 with a link structure 336 which is adjustable in length. The opposite end of this link structure is pivotally connected at 337 with a collar 338 which is journaled upon the cylindrical intermediate section of the rotatable and endwise shiftable shaft 296. The collar 338 is journaled in a groove 339 of a sleeve 341 having flanges 342 and 343 on opposite sides of said groove. A rigid connection between the sleeve 342 and the shaft 296 is attained by means of a pin 344 extending diametrically through these parts.

The adjustable link 336 comprises a pair of end members 345—346 having threaded sockets 347—348 for respectively receiving threaded end portions of a rod 349. Lock nuts 351 prevent rotation of the rod 349. A corresponding link structure 352 has its end portions respectively pivotally connected at 353 with the collar 307 and at 354 with the plate-like lever 333. The pivotal connection 335 of the link structure 336 with the lever 333 is adjustable lengthwise of the lever (radially of its fixed pivot 334) within an arcuate slot 355 having the pivot connection 337 coincident with the center of generation of such slot. Adjustment of the pivot connection 335 lengthwise of the slot 355 will change the distance the collar 338, and consequently the shaft 296, are axially moved pursuant to a given pivotal movement of the lever 333. A slot 356 corresponding to the slot 355 provides adjustment for the pivot connection 354 radially of the fixed pivot for the lever 333, wherefore the link structure 352 can be caused to impart a different amount of axial movement to the collar 307 per unit of pivotal movement of said lever.

The arcuate slot 356 has its center of generation coincident with the axis of the pivotal connection 353 while the lever 333 is in the Fig. 6 position. This facilitates adjustment of the pivotal connection 354 endwise of the slot 356 without disturbing the position of the lever 333 or of the collar 307. Also the disposition of the arcuate slot 355 enables the pivotal connection 335 to be adjusted lengthwise of this slot without disturbing lever 333 or the axial position of the collar 338 while the lever is in the Fig. 6 position.

In the operation of the rubber band transferring mechanism for successively picking up rubber bands from the station D in Fig. 4 and depositing these rubber bands upon the lower end portion of the upper central tube 64 of the tampon assembling mechanism, the cam follower 332 Fig. 6 will be traversing the cam groove 326 in a counter-clockwise direction, and this cam follower will be in the "low" portion 328 of the cam slot for a period prior to and during registration of the picking fingers 291—292 with a rubber band at station D. While the cam follower is in the "low" portion of the cam slot the plate-like lever 333 will be at a clockwise limit of oscillative movement about the pivot 334. This lever will therefore have exerted endwise thrust through the link structures 336 and 352 for moving the collar 338 to the right into the position illustrated in Fig. 6 and for moving the collar 307 to the left into the position illustrated in Fig. 6. Such movement of the collar 338 causes endwise movement of the shaft 296 and of the picking finger 291. Such endwise movement of the collar 307 causes like movement of the sleeve 305 and of the picking finger 292 whereby these two picking fingers 291—292 are disposed in their contiguous closed position illustrated in Fig. 6. As the thus closed fingers 291—292 arrive at the delivery station D, Fig. 4, these fingers will enter the rubber band in an axial direction. Spring fingers S, Figs. 4 and 4b at the delivery station D are engaged by diametrically opposite sides of the rubber band as it is being entered by the picking fingers, and these springs are effective for first pushing the rubber band entirely onto the fingers so that it will finally be lodged upon root portions thereof immediately adjacently to shoulders 298 and 357. The springs S allow the picking fingers 291—292 and the band thereon to pass therebetween and then spring back to the position illustrated in Fig. 4b.

As the picking fingers follow along the circular path 293 toward the tampon assembling mechanism (see tube 64 of such mechanism in Fig. 6) the cam follower 332 will traverse the "rise" portion 327 of the closed cam groove 326 and will eventually reach the beginning of the "high" portion 329. During traversal of the "rise" portion the lever 333 will be pivoted counter-clockwise, thereby pulling upon the two link structures 336—352 causing the fingers 291—292 to move respectively radially outwardly and radially inwardly from the circular path 293 equal distances. When the cam follower 332 reaches the "high" portion of the cam, the fingers 291—292 will be spread sufficiently to pass upon opposite sides of the tampon assembling apparatus tube 64.

Immediately prior to the tips of the picking fingers 291—292 reaching registration of the tampon assembling apparatus tube 64 the pinion 311 will commence to mesh with one end of the row of teeth 319 of the mutilated gear 321. Prior to the pinion 311 reaching the gear teeth 319, a flat face 358 of this pinion, which is also mutilated, Fig. 7, was being carried in sliding relation with the semi-circular flat face portion 359 of the fixed mutilated rack 321. In this manner the complementally engaged faces 358 and 359 maintain the picking fingers 291—292 in a horizontal plane and pointing in the direction of their movement along the path 293. The row of gear teeth 319 has just enough teeth to impart a single complete revolution to the pinion 311 and consequently to the shaft 296 and the parts constrained for rotation therewith including the picking fingers 291—292. Swinging motion thus imparted to the picking fingers about the axis of the shaft 296 causes these fingers to be manipulated with respect to the lower end of the tube 64 in the manner illustrated in the successive stages of movement illustrated in Figs. 8 to 11b.

In Fig. 8 it can be seen that as the fingers 291—292 approach the tube 64 (only the finger 291 being visible in Figs. 8 to 11b) these fingers will be at the same stage of elevation as a lower end portion of such tube, whereby the upper flight of the rubber band 39 upon these fingers will be disposed a short distance above the lower end of the tube. Rotation of the pinion 311 and the consequent swinging of the fingers 291—292 will be clockwise as viewed in Figs. 8 to 11b. This clockwise swinging of the fingers commences in time that the tips thereof will be projected upwardly along opposite sides of the tube at the time the upper flight of the rubber band engages the approach side of the tube. This position is illustrated in Fig. 9. At a subsequent stage in the operation the fingers will be swung sufficiently far to elevate the lower flight of the rubber band for projecting it upwardly on to the opposite side of the tube as illustrated in Fig. 10. Later, the swinging fingers are carried beyond registration with the tube while holding the previous lower flight of the rubber band above the lower edge of the tube is accommodated by the elasticity of the rubber band which is then stretched as illustrated in Fig. 11. Immediately thereafter the fingers are swung sufficiently far to release the stretched band and guide the former lower flight thereof onto said opposite side of the tube incident to the band contracting on to the tube, Fig. 11a. By the time the pinion 311 has been rotated 180° and the picking fingers swung through 180° these fingers will occupy the position illustrated in Fig. 11b with respect to the tube 64. By the time the pinion 311 traverses the row of gear (rack) teeth 319 this pinion and the fingers will have moved through 360° and will be maintained in this position by the slidably contacting faces 358—359. At this time the cam follower 332 will be caused to traverse the "fall" portion 331 of the cam groove 326 and thereby cause pivoting of the lever plate 333 for exerting thrust through the link structures 336—352 for bringing the fingers 291—292 together preparatory to commencing another cycle involving picking up a succeeding rubber band which will have been placed at the delivery station D of the cutting and feeding apparatus in Fig. 4.

It is contemplated that the present machine will be employed for making different size tampons and in some instances will accomplish this by the substitution of tubes 64 of different diameter. This would make it desirable for the picking fingers 291—292 to be spread apart correspondingly different distances while straddling these different tubes. This is why the picking fingers are moved in opposite radial directions with respect to the axis of the shaft 175 when being spread, so that when an adjustment is made in the distance of their spreading, the median point between these fingers will register with each of the tubes; that is, the fingers 291—292 will always pass equal distances from diametrically opposite sides of any of the different diameter tubes as 64. Selective predetermined spread of the fingers 291—292 is attainable by adjusting the pivot connections 335 and 354 in their respective associated arcuate slots 355—356 of the plate-like lever 233.

Gauze feeding and cut off mechanism

The gauze feeding and cut off mechanism is visible in Figs. 1, 2, 14, 15 and 16. This mechanism is adapted to automatically unwind a coil 380 of a gauze strip, cut suitable lengths of gauze from the strip and place the cut off lengths of gauze strip between the sets of upper and lower tubes of the tampon forming mechanism. The roll of gauze is rotatively supported upon a rod 381 extending axially therethrough and having end portions supported in declining notches 382 in sideplates 383 of a gauze roll-supporting frame 384 which rests upon the front right end portion of the table top 41.

The free end of the gauze strip feeds out between the side plates 383 over a feed plate 371 which is supported on a bar 372 to which the plate is secured by screws 373. A wire-like rod 374 pivotally supported at its ends in the side plates 383 has eccentric humps 375 which press the gauze frictionally against the plate 371 as the gauze passes between such rod and the plate. Notches 376 in the rear edge of the plate accommodate entry of paired fingers 386—387 for gripping an end of the gauze strip projecting rearwardly over the plate. These fingers 386—387 are for pulling the gauze strip outwardly a predetermined distance, at which time the fingers will be stopped in their rearward motion at a position of which that represented by the letter B in Fig. 14 is representative. While the fingers are at rest and the gauze strip is held tautly between these fingers and the gauze roll 380, the blades 388 and 389 of shears 390, Figs. 1, 2 and 17, are operated for cutting off the strip along a transverse section coinciding with position A in Fig. 14, thus detaching a strip of gauze having a length equal to the distance between positions A and B. This strip is then held between the two pairs of fingers 386—387 and immediately thereafter carried by these fingers rearwardly a distance to cause the center of the cut-off strip portion (or swatch) to register with and drape over the upper end of the inner lower tube 56 of the tampon assembling mechanism. This position of a gauze swatch 391 is illustrated in Fig. 2. The pairs of fingers 386—387 will be carried rearwardly past opposite sides of the tampon assembling tube 56 incident to carrying the gauze swatch into registration with the upper end of such tube. After depositing the swatch upon the upper end of the tube 56 the fingers 386—387 will be released from the swatch and returned in an open condition to position A in Fig. 14 for grasping the fresh end of the gauze strip and commencing a new cycle pursuant to which a succeeding length of the gauze is cut off to form a swatch and fed to the tampon assembling mechanism.

The pairs of gauze gripping fingers 386—387 are carried upon a swingable structure 392 which is pivotally mounted upon a cam shaft 393, Figs. 2 and 14. This swingable structure comprises a lower casting 394 having axially spaced footing portions 395 which contain bearings receiving the constantly rotating cam shaft 393, Fig. 14c. A plate 396 bolted to the front face of the casting 394 has laterally spaced uprights 397 welded thereto, Fig. 14b. A pair of vertically spaced short parallel links 398—399 are pivotally connected respectively with each of the uprights 397. Each link 398 is pivotally connected to its upright by a pin 400, whereas each link 399 is pivotally connected with its upright by a pivoted pin 401. The gauze engaging fingers 386 are respectively mounted on the upper sides of the upper links 399 and project forwardly therefrom. The upper gauze engaging fingers 387 are connected with and project forwardly from the lower sides of respective horizontal portions of inverted J-rod structures 402 which are pivotally connected with and carried by the back ends of the parallel links 398—399. An upper portion 403 of each inverted J-rod structure 402 is connected to a lower portion 404 thereof by a threaded member 405 which is rotatively adjustable for varying the vertical spacing of the portions 403—404 and thereby changing the time at which the fingers 386—387 can be separated incident to the structure 402 being elevated. A spring 406 connected between each of the upper links 399 and an anchorage 407 on its associated upright 397 urges the fingers into their closed gauze-gripping relation.

The gauze gripping fingers 386—387 are opened by a rockable member 408 pivotally mounted on the casting 394 by a pin 409. A forwardly projecting flange 411 on the member 408 is movable upwardly against the lower ends of the rod structures 402 for displacing these rods upwardly and separating the fingers when the member 408 is rocked clockwise as viewed in Fig. 14. A pair of juxtaposed cam follower rollers 412—413 rotatively carried between furcations 414 of an arm 415 on the rockable member 408 are cooperable with a cam structure 416 comprising cam members 417 and 418 which are constrained for rotation with the constantly rotating cam shaft 393.

Cam member 417 has a lobe 419 which partially conceals a similar lobe 421 on the cam member 418. The cam member 417 is mounted coaxially upon the cam member 418 and is rotatively adjustable relatively thereto for changing the distance between the rising profile 422 of the lobe 419 and the descending profile 423 of the lobe 421. When cap screws 420, Fig. 14c, are loosened a plate 420a releases the cam 417 to facilitate relative rotation of the cams. Cam lobe 419 cooperates with the cam follower 412 for initially rocking the member 408 and causing the gauze engaging fingers 386—387 to separate. Subsequently the outer periphery of the lobe 421 comes into registry with the cam follower 413 and thereby retains the gauze fingers separated until such roller 413 can descend along the profile 423, the roller 412 then having been carried beyond the lobe 419.

A cam structure 424, Figs. 14, 15 and 16, together with an intervening linkage causes switching motion to be imparted to the swingable structure 32 upon which the gauze gripping fingers are mounted. Such intervening linkage comprises a rockable multi-armed lever 425, Figs. 14 and 15. One arm of this level embodies a metal strap 426 having an arcuate end portion 427 which is connected with the pivoted casting 394 by means of an adjustable link 428 and a slider 429 which is adjustable lengthwise on said curved end portion. The radial center of the curved end portion 427 substantially coincides with a pivotal connection 431 between the upper end of the link 428 and the rockable casting 394 while the casting 394 and the lever 425 are pivoted counter-clockwise to place the fingers 386—387 at the gauze engaging position A, so that adjustment of the slider can then be made upon the curved end portion without disturbing the position of said casting and fingers.

An arm 432 of the lever 425 is bifurcated at its upper end and carries two coaxial cam follower rollers 433 and 434 for respective cooperation with cam members 435—436 of the cam structure 424. A downwardly and rearwardly projecting arm, 437, of the lever 425 is connected with one end of a contraction spring 438 which has its upper end anchored at 439 to the table top 41. The three arms 432, 437 and 438a of the lever 425 radiate from a common hub 441 which is oscillatively mounted upon a rod 442 which is supported at opposite end portions in hanger bars 443 and 444 depending from the lower side of the table top. A portion of the strap 443 is broken away in Fig. 14 to expose the cam structure 424. Brace strap 445 anchored to the table top is connected with a lower portion of the hanger strap 443 and also with a third hanger bar 446.

Hanger bar 446 pivotally supports, at 447, a lever 448 which carries a cam follower roller 449 at its upper end for cooperation with a cam member 451 of the cam structure 424. In Fig. 15 it can be seen that the cam structure 424 includes three cams 435, 436 and 451. A lower portion 452 of the lever 448 is curved and carries a slider 453 which is adjustable lengthwise thereof without changing the position of the lever 425 while the levers 425 and 448 are in their counter-clockwise positions. This slider is connected by a link 454 and a pivot 455 with the lower end of the arm 437.

Cam follower 449 controls movement of the gauze-gripping fingers 386—387 in their movement from position A to position B, Fig. 14. When said fingers are at position A, the short radius profile section 461 of the cam 451 will be passing beneath the follower 449 and in contact therewith. The long radius profile portion 462 of the cam member 435 will have passed (clockwise, Fig. 14) from registration with the follower 433 so that this latter follower will be suspended out of contact with any peripheral portion of the cam member 435. Likewise the cam member 436 will at this time present no profile portion in contact with its complemental follower 434. Cam lobe 421 of the cam 418, Fig. 14, will have passed (clockwise) from beneath the roller 413 to have permitted the spring 406 to close the fingers 486—487 upon the rearwardly projecting end of the gauze strip. Eventually the rise profile portion 463 of the cam 451 comes into registration with the follower 449, and as it passes along this follower it causes clockwise movement of the lever 448 and the consequent impartation of thrust through the link 454 for pivoting the lever 425 clockwise. This raises the link 428 and imparts clockwise motion to the casting 394 about the cam shaft 393. As a consequence of this clockwise movement of the casting 394 and the structure 392 the gauze-gripping fingers 386—387 will reach the position B when the fixed long-radius profile portion 464 of the cam 451 reaches registration with the follower 449, whereupon the rearward movement of the fingers is interrupted. During this quiescent period of the fingers 386—387 the shears 390, Figs. 1, 2 and 17, will be operated for cutting off the pulled-out portion of the gauze strip.

At this time it should be noted that the distance of point B from the point A is selectively varied by changing the position of the slider 453 on the arcuate lever section 452. If a longer piece of gauze is desired to be cut from the gauze strip, the position B will be shifted rearwardly by moving the slider 453 downwardly toward the free end of the curved lever portion 452. Should a shorter piece of gauze be desired, the slider 453, will be adjusted in the opposite direction. This adjustment of the slider 453, of course, has no influence upon the position of the associated cam follower 449 with respect to the cam 451 cooperable therewith. Therefore, irrespective of the position of the slider 453 and the consequential position of the gauze-gripping fingers from the position A for determining the length of the piece of gauze to be cut from the main strip, this desired length of gauze piece will be pulled out and the fingers 386—387 will stop in their rearward movement at the selected position B when the cam follower 449 first reaches the constant radius profile 464 of the cam 351. Thus the timing of the machine is not affected by changing the position of the slider 453, wherefor the cut-off shears 390 for the gauze will be operated in proper timed relation with the gauze pull out mechanism so the shearing operation takes place while the finger 386—387 are at rest.

While the constant radius profile section 464 is passing under the follower 449, and subsequent to the operation of the gauze shears 390, a curved profile 465 of the cam member 436 will be carried into contact with the cam follower roller 434 and thereby commence to pivot the lever 425 in a clockwise direction. This pivoting of the lever 425 is also opposed by the spring 438, and during such clockwise pivoting of the lever 425 by the cam profile 465 and the follower 434 the link 454 will cause pivoting of the lever 448 for lifting the follower 449 from the cam member 451. Rearward movement of the fingers 386—387 is therefore resumed by virtue of force received from the cam profile 465 by the cam follower 434 and until the longer radius profile portion 462 of the cam 435 comes into registry with the follower 433. At this time the fingers 386—387 will be disposed rearwardly of the tampon assembling mechanism tubes 56 and 65, as illustrated in Fig. 2. It is desired for the fingers 386—387 to move rearwardly a distance for causing the center of the gauze piece to register axially with the tubes 56 and 65. Such registration is incurred by moving the slider 429 along the curved lever section 427. When a longer gauze piece has been cut from the strip, it will be necessary for the fingers 386—397 to move rearwardly a greater distance for bringing the center of this piece into coaxial relation with the tubes 56 and 65, and this is accomplished by moving the slider 429 outwardly of the lever curved section 427. A shorter gauze piece will involve adjustment of the lever slider 429 in the opposite direction.

Substantially simultaneously with arrival of the gauze strip into registration with the tampon assembling mechanism 55 the rise profile portion 422 of the cam lobe 419, Fig. 14, will overtake the follower 412, and the lobe 419 will pass into registration with such follower for releasing the fingers 386—387. Control of the gauze piece 391 is transferred to the tampon assembling mechanism at this time by downward movement of the tube 64, Fig. 5, which thereby cooperates with the upper end of the tube 56 for preventing accidental displacement of the gauze piece after it is released by the fingers 386—387 and during the retrograde movement of these fingers which ensues.

Immediately after the long radius profile portion 462 of the cam member 435 passes from registration with the roller 433, a descending profile portion 466 of such cam member commences to cooperate with the cam follower roller 433 to control counter-clockwise motion of the levers 448 and 425 by the force imparted thereto by the spring 438. Such counter-clockwise movement of the levers 448—425 causes the aforesaid retrograde movement of the gauze-engaging fingers 386—387. During this retrograde motion of the fingers 386—387 they are held apart first by the cam lobe 419 in registry with the follower roller 412 and subsequently by the cam lobe 421 cooperatively with the follower 413. The descending profile portion 423 of the lobe 421 passes beneath the roller 413 and allows the fingers to close upon their being returned to position A, so that when the fingers do close they will establish a gripping relation with the leading edge of the gauze strip preparatory to pulling the strip rearwardly pursuant to performance of the succeeding operating cycle. When the fingers 386—387 have been returned to position A, the short radius profile section 461 of the cam member 451 will again be in registry with the cam follower 449, and the rise profile portion 463 of this cam member will be approaching said follower preparatory to displacing the same for moving the fingers from position A to position B in starting the succeeding operating cycle.

Proper timing of the opening of the gauze-gripping fingers 386—387 while they are in the position illustrated in Fig. 2 can be attained by adjusting the cam member 417 rotatively about the shaft 393 so that the cam lobe 419 can be caused to pass beneath the roller 412 in sufficient time to release the gauze piece 391 before the fingers are moved forwardly from the tampon assembling mechanism 55, and also to avoid premature opening of the fingers so the gauze piece cannot move out of registry with the mechanism 55 prior to such gauze piece being grasped between the tubes 64 and 56, Fig. 5.

In Figs. 14, 15 and 16 it can be seen that the cam member 436 is mounted upon the cam member 435 by means of a pivot support 471. A threaded end portion 472 of this support screws into a threaded hole 473 in the cam member 436, and a set screw 474 resists relative rotation of the members 471 and 436. In Fig. 14 a pair of faces 475—476 can be seen upon the cam member 436 for respective engagement with set screws 477—478 carried by the cam member 435. By loosening the set screw 474, and one of the set screws 477 or 478 and tightening the other of the screw 477 or 478, the radial position of the cam profile 465 on the member 436 can be varied and thereby cause it to effect an initial gradual pressure relation with its cooperative cam follower roller 434. When this position of the cam profile 465 has been determined, each of the set screws 474—477—478 will be tightened for maintaining the adjustment.

The gauze cutting shears 390 are mounted by means of their pivot pin 481 upon a bracket 480, Figs. 2, 17, 18 and 19, which is secured to one of the gauze frame plates 383. Operation of the shears is effected through a pair of links 482 and 483 which are respectively pivotally connected to the shear blades 388—389 at 484—485. The lower ends of these links are pivotally connected with arms 486—487 extending generally oppositely from a rockable hub 488 rockably disposed on a headed bearing pin 489 anchored in a bearing bracket 490. In Fig. 17 the shears are shown with their blades closed, but rocking of the hub 488 clockwise will cause the link 482 to be pulled downwardly and the link 483 to be thrust upwardly for separating the shear blades to the dotted line positions.

A spring 491 urges the hub 488 to turn counter-clockwise and thereby presses a cam follower roller 492 against the profile of a cam 493 which is constrained for rotation with a shaft 494. Shaft 494 is constantly rotated, it being driven by mated bevelled gears 495—496 respectively upon the shafts 83 and 494, Figs. 2 and 17. Said shaft 494 is supported in bearing blocks 497—498, Fig. 2. Once during each revolution of the cam 493 the follower 492 will register with the middle portion of a straight profile portion 501 of the cam and thereby permit the spring 491 to close the shears for cutting off a piece of gauze while the gauze-gripping fingers 386—387 are at rest in position B of Fig. 14. Subsequent to the cutting off of the gauze piece, a profile point 502 will approach the cam follower 492 and cause the shears to be opened. They will remain open while the circular long radius profile portion 503 passes under the follower and the shears will not commence to close until cam profile point 504 again passes beneath the follower.

*String feeding and cut off mechanism*

A mechanism for feeding a string lengthwise into the machine and for cutting pieces of predetermined length from the string for assembling respectively with the tampons is shown in Figs. 2, 21 and 22. The mechanism is driven by and intermittently with the turret 67 and serves to place the center of a short piece of string diametrically across the lower end of each turret tube 66 while it is in registry with the upper end of the tampon assembling mechanism tube 63. Such registration of a tube 66 with the tampon assembling mechanism tube 63 is shown in Fig. 5. In Figs. 21 and 22 the position which the tubes 66 successively occupy while in axial registry with the tampon assembling mechanism tubes is designated PO. A string feeding and measuring reel 511 is rotatively supported upon a depending portion of a vertical bearing rod 512 having its upper end supported in a frame-mounted bracket 513. A machine bolt 514 threaded into the lower end of the rod 512 and a washer 515 prevent downward endwise movement of the reel 511. This reel comprises a sleeve 516 journaled upon the rod 512, a sprocket wheel 517 secured to the upper end of said sleeve and a thin horizontal member 518 secured to the lower end of said sleeve. The sprocket 517 is disposed in the same horizontal plane with a sprocket 519 which is constrained for intermittent rotation with a turret shaft 521. There are eight times as many teeth on the sprocket 519 as on the sprocket 517, wherefore a driving chain 522 trained about the sprockets will cause the sprocket 517 to make a 180° rotative movement each time the turret 67 is intermittently advanced an amount to station a succeeding tube 66 at the position PO, it being observed that there are sixteen filling material receiving tubes or carriers 66 on the turret.

There are two identical plates 523 and 523′ secured to diametrically opposite sides of the member 518. These two plates occupy a common horizontal plane. Plate 523 can be seen in Fig. 21 to embody a pair of string-holding projections 524—525 and a string feeding projection 526. The projections 524—525 are so positioned on the plate as to straddle the tube registration position PO when the plate 523 comes to rest following alternate intermittent motions imparted thereto. Wirelike spring elements or fingers 527, 528 and 529 have eyelets 531 formed at inner ends thereof and these eyelets receive rivets 532 which also pass through apertures in the plate 523 and in the member 518 for securing said plate and the spring fingers in assembly. The fingers are on the upper side of the plate 523, and end portions of the fingers project downwardly through respective holes 533 in the plate extensions 524, 525 and 526. Terminal portions 534 of the fingers cooperate with undersides of the extensions 524, 525 and 526 for gripping onto string sections which are inserted somewhat radially of the member 518 and endwise of the finger terminal portions into gripped relation between these terminal portions and the undersides of the plate extensions. In this manner the string sections are impositively retained upon the string feeding reel 511.

The plate 523′ and the parts carried thereby are respectively identical with the parts just described upon the plate 523 and this specification is expedited by simply designating these corresponding parts on the plate 523′ by the same respective reference characters but supplemented by a prime. The reel is adapted to feed a string ST endwise in the direction indicated by the arrow alongside thereof in Fig. 21 from a spool, not shown, of such string.

Shears 535 for cutting the string ST into pieces for respective assembly with the tampons comprise short blades 536—537 of which the latter is non-rotatively fixed upon the shank 538 of a headed member 539 having one end non-rotatively anchored in the frame upright 49. Said shank 538 oscillatively carries a hub 541 of the shears blade 536 and an end of said shears blade is connected by a vertical link 542 with one end of a lever 543 which is pivoted to the upright 49 by a pin 544. The forward end of lever 543 carries a cam follower roller 545 operated by a cam 546 constrained for rotation with the shaft 83 and having a cam lobe 547. Each time the cam lobe 547 passes beneath the follower 545, the link 542 will be pulled downwardly sufficiently far to close the shears for cutting the span 37 of string held between the terminal of springs as 529′ and 527 while stationed as shown in Fig. 21.

In a preceding section of this description subtitled "Driving Motor and Power Transmitting Elements" the driving train for the shaft 83 was described, and in the section subtitled "Turret and Intermittent Driving Means Therefor" the driving mechanism for the turret and consequently for the shaft 521 and the sprocket wheel 519 was described, and from these two preceding descriptions it is ascertainable that the sprocket 519 is intermittently driven in timed relation with rotation of the shaft 83. Since the string feeding reel 511 is driven from the intermittently driven sprocket 519 by the chain 522 it follows that the reel is operated in timed relation with the intermittent operation of the shears 535 which are operated under control of the cam 547 on said shaft 83.

Each time the shaft 521 and the turret 67 are rotatively advanced for bringing a succeeding of the filling material carriers 66 into registry with the station PO, the chain 522 will concurrently cause the reel 511 to turn 180° counter-clockwise to carry the succeeding pair of string holding projections 524—525 or 524′—525′ into straddling registry with the carrier tube 66 which has been brought to the station PO. These projections as 524—525 will position a section 35 of the string in substantially diametrical relation across the lower end of said carrier tube. While such carrier tube 66 and string section 35 are at the station PO, the cam lobe 547 will pass beneath the follower 545 for closing the shears and cutting off a string section 36 adjacently to the plate projection as 526′. The cam lobe 547 has a relatively short span circumferentially of the cam so that as soon as the shears 535 have severed the string span 36 they will be opened to facilitate subsequent movement of the plate projection as 526' therebetween pursuant to the feeding of a new section of the string ST. Subsequent to the shearing of the string span 36, the two projections 524—525 in spanning registry with the position PO will releasably hold the string span 35 beneath the tube 66, wherefor when the filling material in this tube is forced downwardly into the tube 63, Fig. 5, by mechanism described under the next subheading titled "Tampon Assembling Mechanism," the filling material will engage sufficiently firmly with the string to cause it to be withdrawn endwise from its impinged relation with the lower sides of the projections 525—526, the mid-section 35 of the string remaining against the filling material while the two free end portions of the string follow the filling material downwardly into the tube 63 of the tampon assembling mechanism.

After the string and the filling material have been discharged downwardly into the tampon assembling mechanism, the carrier tube 66 will be advanced to carry a succeeding tube, loaded with filling material, into position PO, and pursuant to this movement of the carrier 67 the reel 511 will be rotated 180° to place the other projections as 524'—525' in spanning registry with such position PO and the string mid-section 35' in substantially diametrical relation across the lower end of the newly stationed tube 66. Shortly after this, the shears 535 will be operated as explained above, and this succeeding piece of string thereby cut off by the shears will be discharged downwardly with the filling material into the tampon assembling mechanism. This cycle is repeated with each intermittent advance of the turret.

Tampon assembling mechanism

An understanding of this part of the description will be facilitated by reference to Figs. 2, 5, 12 and 24 to 29. Reference has been made hereinabove to the upper set of three telescopically associated tubes of the tampon assembling mechanism 55 as the inner upper tube 63, the middle upper tube 64 and the outer upper tube 65. Tube 63 may also be regarded as a filling material guide tube since filling material from the tubular carrier element 66 is received by the tube 63 and guided thereby downwardly into a forming tube 56 which is the inner of two lower telescopically associated tubes of this tampon assembling mechanism. The outer lower tube 62 is slidable lengthwise on the tube 56 which is mounted upon the upper wall 58 of the suction chamber 59; see Fig. 12.

After a rubber band 39 has been deposited upon the lower end portion of the middle upper tube 64 by the transfer mechanism illustrated in Figs. 6 through 11b, the gauze feeding and cutting mechanism will dispose a piece of gauze over the upper end of the inner lower tube 56, as illustrated in Fig. 2. Substantially concurrently with the placement of the gauze 391 over the upper end of the tube 56 the upper tube 64 (rubber band receiving tube) will be caused to descend telescopically over the upper end of said tube 56 for holding the gauze piece 391 in position while the gauze-gripping fingers 386—387, Fig. 14, are released from the gauze and returned for attaching to a succeeding piece thereof. The tube 64 causes the piece of gauze to be hooded over the upper end of the lower tube 56 as illustrated in Fig. 24. The upper outer tube 65 (rubber band ejecting tube) is caused to descend more rapidly than the band receiving tube 64 and in this manner is caused to descend sufficiently far with respect to the tube 64 to eject the rubber band 39 therefrom onto a section of the hooded piece of gauze when the tube 64 reaches a position as that illustrated in Fig. 25.

Next the upper tubes 64 and 65 are caused to rise leaving the gauze hooded over the lower tube 56 as illustrated in Fig. 26. Then the filling material delivery tube 63 is raised to close the gap between it and the carrier tube 66 to facilitate transfer of the filling material 34 downwardly into tube 63 by a long slender poker 565, Figs. 2, 3, 27 and 29. Meanwhile the lower outer tube 62 has started to rise and as it does so an annular space 555 enclosed between the tube 56 and a thin wall upper end portion 556 of this tube extending upwardly from an internal shoulder 557 receives the "tails" or perimetric edge portion of the hooded gauze piece 391 as the upper edge of the tube 62 folds these tails upwardly over the rubber band 39 as shown in Fig. 28. Upon further rising of the tube 62 the shoulder 557 encounters the rubber band 39 and pushes such band and the hooded gauze upwardly to attain a position illustrated in Fig. 29. Meanwhile suction created by a constantly driven fan 558, Fig. 12, induces the flow of air downward through the tube 56 into the chamber 59, Fig. 12, and through a telescopical conduit structure 559 into the fan 558 from which the air is discharged. Preferably the air is discharged from the fan through a screen (not shown) for removing lint picked up from the gauze and filling material, and thus prevent discharge of this light-weight trash into the atmosphere. At this time a slideable section 561 of the telescopic conduit structure will be moved to the right from the position illustrated in Fig. 12 for placing a diagonal end 562 thereof into abutting relation with a complemental diagonal end 563 of the cylindrical chamber 59.

The lower outer tube 62 rises just far enough to push the rubber band into position for lodging it in a circumferential groove 564 in the outer periphery of the tube 56 adjacently to its upper end. The air entering the upper end of the tube 56 reverses the hood of the piece of gauze and converts it into a bag projecting downwardly into the tube 56 as illustrated in Fig. 29. Since the upper end portion 556 of the tube 62 pushes the tails of the gauze piece upwardly above the end of the tube 56 the air entering the tube 56 will draw these tails downwardly into the sack or bag. While the parts including the bag-forming piece of gauze are in this position, such bag is ready to receive the filling material 34 from the filling material delivery tube 63.

While the tube 62 was moving up from the Fig. 27 position to the Fig. 29 position the tube 63 was reversed in direction and carried down to the Fig. 29 position to better guide the filling material 34 into the awaiting sack formed by the gauze. The poker 565 will have also descended further in its continuous downward motion to the Fig. 29 position. As explained above in the section of this specification titled "String Feeding and Cut Off Mechanism," a center portion 35 of a pull string 36 will have been stretched diametrically across the upper end of the tube 63 before the filling material 34 was poked downwardly wherefore such material will have engaged the central section of the string and thus caused the string to move downwardly with the filling material. Continued downward movement of the poker from the Fig. 29 position will deposit the filling material in the sack with the center section 35 of the string disposed in the distal end 33 of the sack beneath the filling material as shown in Fig. 23.

Although Fig. 29 illustrates the poker 565 as having descended just short of far enough to push the filling material and string into the sack, there is in fact, no interruption in the downward motion of the poker from its uppermost position illustrated in Figs. 2 and 3 (where the lower end of the poker is a short distance above the registered carrier element 66) to the lowermost position illustrated by dotted lines in Fig. 12 where the lower end of the poker has descended below stripper resilient fingers 566 for pushing a completed tampon TP past the lower ends of the fingers. Immediately upon the poker descending beyond the position illustrated in Fig. 29 and thus poking the filling material into the gauze sack the pressure of the poker upon the filling material holds the tails of the gauze piece frictionally against the inner walls of the sack. Therefore when the partially completed tampon unit is forced downwardly by the descending rod 565 the gauze, being looped about the rubber band 39, will pull such band from the groove 564 upwardly over the end of the tube 56 whereupon this band will contract in garter-like fashion upon the poker. When the rod 565 reaches the lower limit of its motion illustrated by the dotted lines in Fig. 12 the flexible stripping fingers 566, which will have been spread by the globular tampon passing them, will spring inwardly against the poker in a position immediately above the rubber band which is sheathed within the gauze piece. Then, as the poker subsequently rises, these fingers will prevent upward movement of the rubber band and will strip the tampon from the poker as illustrated in Fig. 12. After the rising poker is pulled from the sack the rubber band can contract further onto the inturned neck of the sack; see Fig. 23. The poker continues to rise with a continuous motion until it reaches its uppermost position shown in Fig. 2.

At the time the finished tampon unit TP is stripped from the lower end of the rising poker Fig. 12 the slidable section 561 of the conduit structure 559 will be separated from the chamber 59 as illustrated in Fig. 12 so that the air entering an opening 567 in the structure 559 will do so directly from the atmosphere to avoid causing any substantial up-draft through a tampon discharge passage 568. This is so the tampon TP will be unimpeded in its gravitational discharge through this passage 568 onto a conveyer belt 569, Figs. 1, 5, and 12, by means of which the tampons are carried laterally from the machine for discharge into a receptacle 571. The structural characteristics of the completed tampon have been described hereinabove with reference to Fig. 23.

Vertical movement of the inner upper tube 63 is effected by a cam 572 Fig. 5 acting in conjunction with a spring 573 upon a lever 574 pivoted upon a fixed rod 575 mounted on an upright 575a. The right end of the lever 574 is urged downwardly by the spring 573 which is anchored to the table top 41 at 576. A cam follower roller 577 mounted upon the front end of the lever 574 cooperates with the cam 572. A yoke member 578 connects the lower end of a link 579 with the lever 574 and a yoke 581 slideably mounted on an arm 582 is pivotally connected at 583 with the upper end of the link 579. Arm 582 is pivoted at 584 to an upper end section of the frame upright 50. As the cam 572 rotates with the constantly rotating shaft 83, it causes pivoting of the lever 574 and consequent vertical displacement of the link 579 and swinging of the arm 582 for controlling the vertical position of the tube 63. The profile of the cam 572 cooperating with the cam follower 577 is designed for incurring the above described movement of the tube 63 in timed sequence with the above-described movements of the other tubes of the tampon assembling mechanism.

Vertical movement of the tubes 64 and 65 is effected through an arm 585 pivoted at 586 on the frame upright 50. A slider yoke 587 held selectively lengthwise of the arm 585 by a set screw 588 is pivotally connected at 589 with the upper end of a link 591 having its lower end pivotally connected at 592 with a slider yoke member 593 attached to a lever 594. This lever 594 is also pivoted on the rod 575 and is controlled by a cam 595 conjointly with a spring 596. The spring 596 tends to cause the lever 594 to pivot clockwise as viewed in Fig. 5 and thereby presses a cam follower roller 597 on the front end of the lever against the profile of the cam 595. Consequently as the cam 595 rotates with the constantly rotating shaft 83 the lever 594 is pivoted for effecting pivoting of the arm 585 and upward and downward displacement of the tubes 64 and 65 in proper timed sequence and desired distances.

Relative sliding motion of the tubes 64 and 65 is obtained by mechanism illustrated in the upper left hand part of Fig. 5. Tube 64 has a collar 601 rigidly connected with the upper end thereof above the upper end of the tube 65. This collar has a rearward projection 602 containing a notch 603 for receiving a pin 604 carried by the forward end of the arm 585. Thus the pin 604 and the collar 601 provide an articulated connection by means of which the tube 64 is caused to move upwardly and downwardly with the forward end of the arm 585.

Connecting means between the collar 601 and the outer tube 65 for imparting vertical movement to this outer tube concurrently with movement of the tube 64, but at a different speed, includes a forwardly projecting apertured stud 605 on the collar 601 and a pin 606 projecting horizontally oppositely through the stud into pivoted relation with respective furcations 607 of a fork member 608 having a stem 609 endwise slidable in a bearing 610 which is pivotally suspended at 611 from a slider member 612 retainable in adjusted positions lengthwise of a support member 613 by means of a set screw 614. The rear ends of the furcations 607 contain notches 615 which respectively receive studs 616 projecting diametrically oppositely in respect to the tube 65 and carried upon the upper end thereof by upward projections 617.

As the forward end of the arm 585 is caused to descend under control of the cam 595 the collar 601 and the tube 64 will be caused to descend with the forward end of such arm. This descent of the collar 601 and of the pin 606 will cause clockwise swinging of the fork 608 about the pin 611 which remains in a fixed position. Such clockwise swinging of the fork 608 about the pin 611 is accommodated by the pivotal connection of the furcations 607 with the pin 606, and there is concomitant clockwise pivoting of the fork 608 about the pin 606. Consequently the rear ends of the furcations 607 will be caused to descend more rapidly than the collar 601 so that by the time the collar 601 has descended to a position as that illustrated by dotted lines in Fig. 5 the tube 65 will have descended sufficiently far to discharge the rubber band from the lower end of the tube 64.

An analysis of Fig. 5 will reveal that by changing the position of the slider 612 along the support 613 and thereby changing the distance between the pivot pins 611 and 606, the angles between the horizontal position of the fork and the position it occupies upon descent of the tube 64 a predetermined distance can be varied. Therefore by changing the position of the slider 612 upon the supporting member 613 the distance the lower end of the tube 64 reaches downwardly beyond the upper end of the tube 56 before the tube 65 causes the rubber band to be discharged onto the hooded gauze piece can be predetermined. In this manner the length of the hood and consequently the length of the finally constructed tampon can be controlled. When longer tampons are to be formed a corresponding greater quantity of filling material will be loaded into the filling material carrier elements 66 of the turret 67.

Movement of the lower outer sleeve 62 is effected through a lever 621 pivoted at 622 on the frame upright 50. A spring 623 pulling downwardly on a rearward extension of this lever maintains a cam follower roller 624 on the forward end of a lever 625 against the periphery of a cam 626 which is constrained for rotation with the shaft 83. This lever 625 is also pivoted on the shaft 575 and is connected with the lever 621 by a link 626a and slider yokes 627 and 628 respectively on the levers 621 and 625 and pivotally connected with the link 626a. The profiles of the cams 572, 595, and 626 are designed for controlling movement of the cam followers 577, 597, and 624 respectively for imparting the above described movements to the respectively associated slideable tubes of the tampon assembling mechanism. These three cams 572, 595 and 626 are also properly phased circumferentially of the shaft 83 for causing the above described sequential operation of the various vertically slideable tubes of the tampon assembling mechanism.

The poker 565 for ramming the filling material downwardly through the tampon assembling mechanism tubes is guided by a slider 629 Fig. 3, which is slideable vertically upon a guide rod 631 by means of a long oscillatable arm 632 and a link 633 carried pivotally between the front end of such arm and the slider. The lower end of the vertically supported guide rod 631 is anchored to an upper portion of the frame super structure 46 whereas the upper end of the guide rod is held by a socket 634 and a strut 635 which is connected between such socket and the upper end of the frame upright 51.

The arm 632 is bifurcated at its rear end for adapting it to straddle the upright 51 to which such arm is pivotally connected by a bolt 636. A spring 637, Fig. 3, anchored at its lower end to an upright frame member 162 and connected with the arm 632 by a slender link 639 urges said arm and the poker 565 downwardly. However the arm and poker are adapted to be raised against the force of such spring by a constantly rotating cam 641, constrained for rotation with the shaft 83, and having a complemental cam follower 642 carried by an arm 643 pivoted upon a pin 644 extending between upper end portions of upright posts 645 and 646, Fig. 1, which are mounted upon the table top 41. The projecting rear end of the lever 643 is connected with the poker operating arm 632 by long slender vertical link 647. The arm 643 actually projects from a sleeve 648 which is pivotally mounted on the pin 644 and this sleeve 648 also has an arm 649 projecting rearwardly and downwardly therefrom for connection with rear ends of hold down springs 651. These springs are connected with the forward edge of the table top 41 by hooks 652 formed on the forward ends thereof thus enabling these springs to maintain the cam follower 642 against the profile of the cam 641. The rate at which this cam is driven and the contour of its profile are such as to effect the above described movement and sequential operation of the poker 565.

It has been explained hereinabove that the tube 561 of the conduit structure 559, Figs. 12 and 2, is slidable from the position shown in Fig. 12 to a position wherein the diagonal end 562 is against the diagonal end 563 of the suction chamber 59 for establishing communication between the tubular structure 559 and the inner lower tube 56 while the outer lower tube 62 is being moved upwardly for sliding the rubber band 39 into the groove 564, Figs. 5 and 29. Such communication between the conduit structure 559 and the tube 56 causes communication to obtain between said tube 56 and the inlet side of a blower 558 Fig. 12 so that the hooded piece of gauze will be sucked downwardly into the upper end of the tube 56 to form a sack and so the edge portion of this gauze piece forming the tails turned upwardly about the rubber band are also sucked downwardly into the sack. Thus the blower 558 and the conduit structure 559 are instrumental in the formation of the tampon.

When, however, the tampons are finished and are being discharged downwardly past the flexible fingers 566, Fig. 12, an opening at 655 is necessary to permit downward passage of the tampons into the discharge tube 568. Such movement of the conduit structure sleeve 461 into the position illustrated in Fig. 12 provides the opening 655 and also breaks the direct communication between the conduit structure 559 and the suction chamber 59 so the tampons TP will not be sucked into the conduit structure 559 but will drop freely by gravitational force downwardly through the tube 568 and onto the discharge conveyer belt 569. A baffle plate 656 shields the stream of air entering the opening 567 from the tampon units while the conduit tube 561 is in the retracted position of Fig. 12. Said baffle causes the atmospheric air entering the conduit structure to be drawn downwardly through the opening 567 from a zone thereabove in contrast to being sucked upwardly through the tampon discharge tube 568 which would frustrate discharge of the tampons. Reciprocation of the conduit element 561 is effected by a cam 657, Fig. 12, which is mounted for rotation with the constantly rotating shaft 494, Figs. 2 and 12. A cam follower roller 658 cooperating with the profile of cam 657 is carried by a bell crank 659 pivoted at 661 to a bracket 662 secured to the machine frame under the right edge of the table top 41. A spring 663 secured to a leg 664 of the bell crank causes it to press the cam follower 658 against the profile of the cam 657. The other leg, 665, of the bell crank is connected by a link 666 with the reciprocal sleeve 561. A guide stud 667 disposed within an axial notch 668 of the sleeve 561 maintains the diagonal edge 562 thereof rotatively oriented with respect to the diagonal edge 563 of the tubular suction chamber 59.

General statement

A concise reference is made in the introductory part of this specification to the various subcombination instrumentalities employed in the machine. These various instrumentalities are oriented with respect to the drawings in the introductory part of the description immediately following the description of the figures, and a detailed description of each of these instrumentalities appears in the description under subcaptions referring to the subcombinations comprised of such instrumentalities. Inasmuch as the operation of the various parts of the machine are explained in detail in the individual sections of the description pertaining thereto, repetition of those operations is believed unnecessary at this point. It is thought a clear general understanding of the machine can be attained by reference to the introductory part of the specification; that a somewhat more specific conception of the structure and operation of the machine is attainable from the three captioned sections next following the description of the figures; and that a detail understanding of any particular portion of the machine can be acquired by reference to the section of the description bearing the caption related to the subject of interest.

Having thus described a single preferred embodiment of the invention with the view of illustrating the same, and without intention of inferentially limiting the invention to the particular form of any of the elements of the specific exemplification, I claim:

1. In a jacketed tampon making machine, a turret rotatable about a principal axis and having a plurality of tubes spaced circumferentially thereabout with their axes disposed in parallelism with the principal axis, means for intermittently rotating said turret to advance the tubes step by step, there being a plurality of stations spaced circumferentially of said turret to register with respective of the tubes while they are at rest, one of said stations being a tampon filler loading station, means at said station operable in timed relation with the intermittent advance of the turret for disposing a piece of filler material within each tube while it is in registry with such station, a succeeding of said stations being a tampon assembly station, tampon assembling mechanism at said assembly station and including a forming tube arranged in parallelism with the rotational axis of the turret, said forming tube being disposed for coaxial end-to-end registration with each of the loaded turret tubes as they are carried to and successively stopped at the assembly station pursuant to intermittent rotation of the turret, means for successively feeding porous swatches across an end of the forming tube disposed toward the turret tubes registering therewith and at at frequency causing a swatch to be interposed between each loaded tube and the forming tube while registered therewith, and means operated in timed relation with the turret for discharging the filling material from each registered turret tube against a swatch and into the forming tube for incasing the filling material in the swatch.

2. In a tampon making machine, a forming tube having an open end, means for disposing a central portion of a porous swatch over such end of the tube, means for folding back perimetric edge portions of the swatch over and onto such central portion of the swatch on the side thereof facing endwise oppositely from the tube, a filler charge carrier adapted to dispose a charge of tampon filler material in axial registry with the tube and on said oppositely-facing side of the swatch, and means for discharging the filler material from the carrier into said tube pursuant to ramming said perimetric edge portion and said central portion of the swatch into the tube ahead of the filler material.

3. In a tampon making machine, a forming tube having an open end, an intermittently moveable carrier having a plurality of tampon filler carrying elements successively stopping in opposed registry with the open end of the said tube, means for intermittently advancing said carrier, means operated in timed relation with the operation of said carrier for successively feeding porous swatches into registered relation with the open end of said tube and causing a swatch to be disposed between said tube and each carrier element registering therewith, and poker means operated in timed relation with the carrier to poke the filler material charge of each registered element therefrom against the interposed swatch and into the tube for carrying a central section of the swatch into the tube with and ahead of the filling material.

4. In mechanism for assembling a tampon from a fabric swatch, an elastic band and from a charge of filling material dischargeable from a carrier therefor; a group of telescopically associated tubes disposed remotely from said carrier and with their axes directed theretoward; an intermediate group of telescopically associated tubes coaxial with the remote group and disposed spacedly between the remote group and the charge carrier; the intermediate tube group comprising an inner axially movable charge guide tube for guiding the filling material charge from the charge carrier to the remote tube group, an intermediate axially movable band receiving tube and an outer tube axially movable to strip the band endwise from the band receiving tube, the end portion of the band receiving tube toward the remote tube group being exposed to receive an elastic band, the remote group inner tube being exposed at its end portion toward the intermediate tube group to accommodate disposition of the swatch transversely across the end thereof; means for moving the band receiving tube telescopically onto the inner remote tube to hood the swatch thereonto, to then move the outer stripping tube for discharging the band onto the hooded swatch and then retract both the band receiving tube and the stripping tube, means for telescopically moving the outer remote tube to slide the hooded swatch and band part way toward the exposed end of the inner remote tube; suction creating means for inverting the hood into a sack depending into the inner remote tube; means for poking the filling material charge from the carrier therefor through the guide tube into said sack; and means operable in timed relation with the poking means for axially moving the guide tube into contiguity with said carrier as the charge enters such guide tube and for axially moving such tube into contiguity with the remote inner tube as the charge leaves such tube for entering the sack.

5. In mechanism for assembling a tampon from a charge of filling material removably disposed in a carrier therefor and a swatch disposed upon a swatch holding element; a group of telescopically associated tubes disposed lengthwise between said carrier and said element and including an inner filling material guide tube, a center tube disposed about the guide tube and adapted to receive an elastic band about an end portion thereof disposed toward said element, and a stripping tube disposed about said elastic band receiving tube; means for axially moving the band receiving tube and the band stripping tube towards said element for depositing said band onto said element in embracing relation with the swatch and then axially retracting said tube; means for advancing the filling material charge from said carrier through said guide tube and into the swatch on said element; and means operable in timed relation with said charge advancing means for axially moving the guide tube into contiguity with said carrier as the charge enters such guide tube and for axially moving such tube into contiguity with the element as the charge leaves the guide tube for assembly into the swatch.

6. In tampon forming mechanism wherein there are concentric relatively axially movable elastic band receiving and band stripping tubes advanceable endwise over an end of a gauze receiving element for depositing an elastic band thereon; means for advancing said band receiving tube and said band stripping tube from a retracted position wherein a band receiving end portion of the band receiving tube disposed toward said element is exposed by a stripping end portion of the stripping tube, said mechanism comprising means connected with the opposite end of the band receiving tube for advancing the same to place the one end thereof over and about said element, fulcrum means constrained for movement with said other end portion of the band receiving tube, a lever pivotally connected between its ends with said fulcrum means, for pivotal movement about an axis extending perpendicularly to the axes of said tubes, means pivotally connecting one end of said lever with said stripping tube, and means connected with the other end of said lever to facilitate pivoting thereof about the fulcrum means while curtailing movement of such end of the lever axially of said tubes to cause advancement of the one end of the lever and said stripping tube more rapidly than the band receiving tube so the stripping tube will overtake the band and strip it from the receiving tube onto said element.

7. The combination set forth in claim 6, said means connected with the other end of said lever while curtailing movement thereof axially of the tubes comprises a support, a bearing pivotally mounted on said support for swinging about an axis in parallelism with the fulcrum axis, the bearing in said bearing element extending lengthwise of said lever, and said other end of the lever being endwise slideable in said bearing.

8. The combination set forth in claim 7, wherein said bearing is adjustable on said support lengthwise of the lever to selectively determine the position of advancement of the band receiving tube over said gauze receiving element at which the stripping tube strips the band from the band receiving tube.

9. In mechanism for forming a tampon from a swatch, an elastic band and a charge of filling material, an open ended swatch receiving tube, a suction chamber at and communicating with one end of said tube, said tube being adapted to carry a swatch at its opposite end in a manner that the swatch has a central portion thereof extending as a sack into such tube and that an elastic band circumscribes a portion of the swatch extending outwardly of and disposed on the outer periphery of the tube while air entering such other end of the tube enroute to the suction chamber holds tail portions of the swatch over and about the elastic band and into the sack, a poker axially projectable into said other end of said tube for poking a filling material charge into the sack against said tails and continuing its axial movement into the tube incident to advancing the filling material and tail portions and thereby pulling the elastic band over said other end of the tube to facilitate contraction thereof onto the poker, stripper fingers past which the poker and the partly assembled tampon are projectable at the one end of the tube, said stripper fingers being adapted to close onto the poker behind the tampon and elastic band subsequent to their being poked therebeyond, said closed fingers being adapted to strip the tampon from the poker incident to retraction thereof, and means for retracting the poker.

10. The combination set forth in claim 9, wherein a tampon discharge passage is disposed in axially spaced relation with the one end of said tube; said suction chamber comprising a wall interposed between said tube and said discharge passage, said wall being removably assembled in the structure of said chamber and being withdrawable therefrom transversely of the tube to provide clearance for movement of a tampon from the tube into said passage; a suction tube through which air is exhausted from the suction chamber, and said conduit and said wall being constrained for concert movement for causing the conduit to be disposed remotely from the tampon discharge passage when the suction chamber wall is removed for accommodating movement of a tampon into and through the discharge passage.

11. The combination set forth in claim 10, wherein said suction tube includes a baffle element for deflecting atmospheric air entering such suction conduit to diminish induced flow of air from the tampon discharge passage into the suction conduit while the suction chamber wall and such conduit are removed from assembly with the suction chamber structure.

12. The combination set forth in claim 10, wherein there is means operable to at least diminish induced flow of air from the tampon discharge passage into the suction conduit while the suction chamber wall and such conduit are removed from assembly with the suction chamber structure.

13. String feeding and delivering apparatus comprising a reel, impositive spring gripping means carried by and spaced circumferentially of the reel, string cutting means disposed adjacently to the reel in position to cut off a span of string extending about the reel between the gripping means, means for intermittently rotatively advancing the reel to carry one of such impositive gripping means past the string cutting means and for stopping a trailing one of such gripping means short of and adjacently to the cutting means pursuant to each rotative advance of the reel, and means for operating the string cutting means in timed relation with movement of the reel to effect a string cutting operation subsequent to each rotative advance of the reel.

14. String feeding and delivering apparatus comprising a reel having circumferentially spaced notches, string receiving means at the sides of said notches for receiving and impositively holding sections of a piece of string extending circumferentially of the reel and bridging such notches, string cutting means disposed adjacently to the reel in position to cut off a piece of string held thereon, means for intermittently rotatively advancing the reel to carry one of the notches past the string cutting means pursuant to each rotative advance of the reel, and means for operating the string cutting means in timed relation with movement of the reel to effect a string cutting operation subsequent to each rotative advance of the reel.

15. String feeding and delivering apparatus comprising a reel having circumferentially spaced notches, sets of string receiving and impositively holding devices associated respectively with such notches, each set of said devices comprising trailing devices spaced circumferentially of the reel upon opposite sides of their associated notch and a leading device spaced circumferentially of the reel ahead of the other two devices of such set, each of said devices being adapted to receive a piece of string carried laterally thereinto transversely of the rotational axis of the reel and to impositively grip the string fed thereinto, and the leading device of each set being spaced in trailing relation circumferentially of the reel from the trailing devices of the preceding set.

16. In string feeding and delivering apparatus, a reel having a notch in the periphery thereof, axial openings through the reel on opposite sides of the notch and a third opening extending axially through the reel at a position spaced circumferentially from one of the first named openings, spring fingers respectively associated with said openings, each of said fingers being anchored onto one axial side of the reel at a position disposed radially inwardly thereof from its opening, each spring finger having a section extending axially of the reel through its associated opening and an end portion projecting from such finger section radially of the reel on the opposite axial side thereof, said end portions diverging slightly axially from the reel to form string receiving jaws, and said fingers urging said jaws thereof axially of the reel toward the opposite side thereof.

17. In apparatus for producing a tampon of which components include a piece of string cut from a longer piece of string, a tampon assembling mechanism for receiving a mid-portion of such piece of string, a reel having circumferentially spaced notches, string receiving means at the sides of said notches for receiving and impositively holding sections of a longer length of string extending circumferentially of the reel and having portions respectively bridging such notches, string cutting means disposed adjacently to the reel in position to cut off a piece of such string held thereon with its mid-portion being that portion bridging one of the notches, means for intermittently rotatively advancing the reel to carry one of the notches past the string cutting means and into registry with said tampon assembling mechanism pursuant to each rotative advance of the reel, means for operating the string cutting means in timed relation with movement of the reel to sever a piece of string from the longer length thereof subsequent to each rotative advance of the reel, and means operated in timed relation with movement of the reel for poking the mid-portion of the cut-off piece of string into the tampon assembling mechanism.

18. In apparatus for producing a tampon of which components include a piece of string and a charge of tampon filling material, a tampon assembling mechanism for receiving a mid-portion of such piece of string, a filling material carrier releasably retainable of a charge of filling material and movable into spaced proximity to the tampon assembling mechanism, and a string feeding reel having a notched periphery and comprising impositive string holding means disposed upon opposite sides of the notch for holding said string with a mid-portion thereof bridging the notch, means for intermittently rotating the reel in timed relation with the movement of said carrier to carry portions thereof through the space between the proximately disposed mechanism and carrier to place the mid-portion of the string between the carrier and mechanism, and means operable in timed relation with the movement of said carrier and reel for forcing the filler material charge from the carrier against the string mid-portion and into the assembling mechanism incident to carrying the string into the mechanism with the filling material charge and withdrawing the string from the impositive string holding means.

19. In apparatus for producing a tampon of which components include a piece of string and a charge of tampon filling material, a tampon assembling mechanism for receiving a mid-portion of such piece of string, a filling material carrier releasably retainable of a charge of filling material and movable into spaced proximity to the tampon assembling mechanism, and a string feeding unit comprising spaced apart elements for impositively holding the string piece with the mid-portion extending therebetween, said unit being operable to move the string holding elements alternately to and from a position wherein they dispose the mid-portion of the string in alignment with and transversely between said mechanism and the filling material carrier, means for operating said unit in timed relation with the movement of the carrier, and means operable in timed relation with said unit and carrier for forcing the filling material charge from the carrier against the string mid-portion and into the assembling mechanism incident to carrying the string into the mechanism with the filling material charge and withdrawing the string from the impositive string holding elements.

References Cited in the file of this patent

UNITED STATES PATENTS

| | | |
|---|---|---|
| 1,296,870 | Sohm | Mar. 11, 1919 |
| 1,514,742 | Tamassey | Nov. 11, 1924 |

(Other references on following page)

UNITED STATES PATENTS

| | | |
|---|---|---|
| 1,701,863 | Reichel | Feb. 12, 1929 |
| 1,745,504 | Rabinowitz | Feb. 4, 1930 |
| 1,964,468 | Irvine | June 26, 1934 |
| 2,068,107 | Nygard | Jan. 19, 1937 |
| 2,171,572 | Kelly | Sept. 5, 1939 |
| 2,182,871 | Jones et al. | Dec. 12, 1939 |
| 2,220,256 | Martindel | Nov. 5, 1940 |
| 2,263,909 | Webb | Nov. 25, 1941 |
| 2,296,760 | Barry | Sept. 22, 1942 |
| 2,297,847 | Wilckens et al. | Oct. 6, 1942 |
| 2,361,783 | McLaughlin | Oct. 31, 1944 |
| 2,400,250 | Mott | May 14, 1946 |
| 2,409,065 | Pohl | Oct. 8, 1946 |
| 2,441,876 | Fleisch | May 18, 1948 |
| 2,446,305 | Sandberg | Aug. 3, 1948 |
| 2,462,178 | Ganz | Feb. 22, 1949 |
| 2,507,072 | Weber | May 9, 1950 |
| 2,509,622 | Woolcott | May 30, 1950 |
| 2,570,696 | Levine | Oct. 9, 1951 |
| 2,613,399 | Riordan et al. | Oct. 14, 1952 |
| 2,613,400 | Riordan et al. | Oct. 14, 1952 |